(12) United States Patent
Takaesu

(10) Patent No.: US 12,387,757 B1
(45) Date of Patent: Aug. 12, 2025

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masaya Takaesu, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/763,110

(22) Filed: Jul. 3, 2024

(30) Foreign Application Priority Data

Feb. 14, 2024 (JP) ................. 2024-020342

(51) Int. Cl.
  *G11B 5/55* (2006.01)
  *G11B 5/012* (2006.01)
  *G11B 20/10* (2006.01)
  *G11B 27/36* (2006.01)

(52) U.S. Cl.
  CPC ........ *G11B 20/10009* (2013.01); *G11B 5/012* (2013.01); *G11B 27/36* (2013.01); *G11B 2020/10898* (2013.01)

(58) Field of Classification Search
  CPC ............ G11B 5/5547; G11B 20/10453; G11B 2005/0021; G11B 2220/2525; G11B 7/00; G11B 27/36; G11B 20/12; G11B 5/09; G11B 5/596; G11B 5/59605; G11B 5/012; G11B 7/1263; G11B 5/035; G11B 13/036; G11B 20/10305; G11B 21/083
  USPC .......................................................... 360/48
  See application file for complete search history.

(56) References Cited

U.S. PATENT DOCUMENTS

| | | |
|---|---|---|
| 10,460,759 B1 | 10/2019 | Farhan et al. |
| 11,081,135 B2 | 8/2021 | Qiang et al. |
| 11,200,911 B1 | 12/2021 | Burton et al. |
| 11,646,051 B2 | 5/2023 | Isokawa et al. |
| 2022/0068302 A1 | 3/2022 | Tomoda et al. |
| 2023/0046510 A1* | 2/2023 | Fujiwara .............. G11B 21/106 |

FOREIGN PATENT DOCUMENTS

JP 2022-0037511 A 3/2022

* cited by examiner

*Primary Examiner* — Nabil Z Hindi
(74) *Attorney, Agent, or Firm* — Knobbe, Martens, Olson & Bear, LLP

(57) ABSTRACT

According to one embodiment, a magnetic disk device includes a disk, a write head, a write processing unit selecting a shingled magnetic recording, a determination unit, and a refresh processing unit. The determination unit determines whether a quality-degraded recording sector exists in all recording sectors in each of the bands. If it is determined that a target band including the quality-degraded recording sector exists in the bands, the refresh processing unit refreshes target recording sectors. The target recording sectors include the quality-degraded recording sector. In the target band, the number of the target recording sectors is less than the number of all recording sectors.

10 Claims, 12 Drawing Sheets

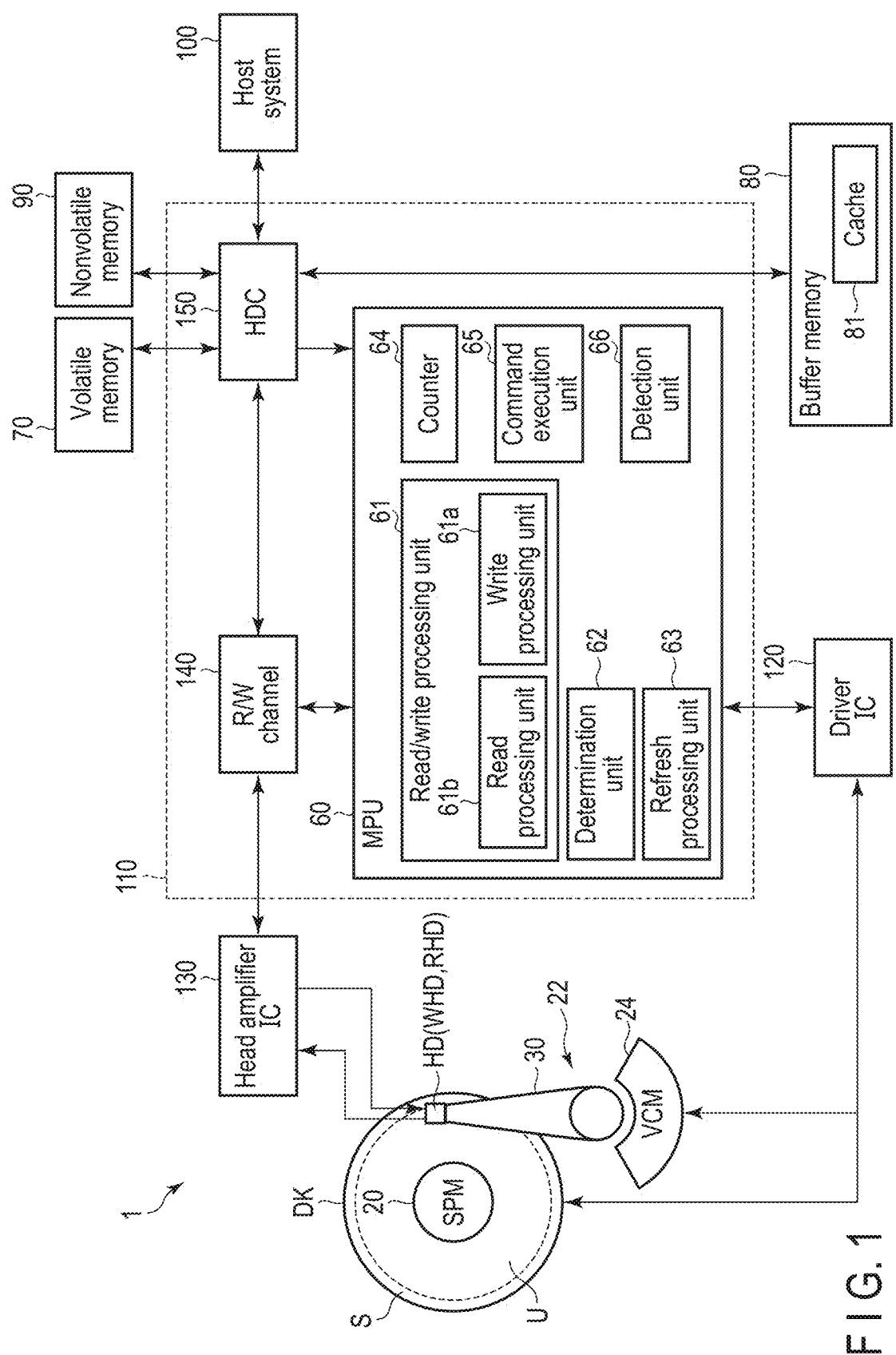
F I G. 1

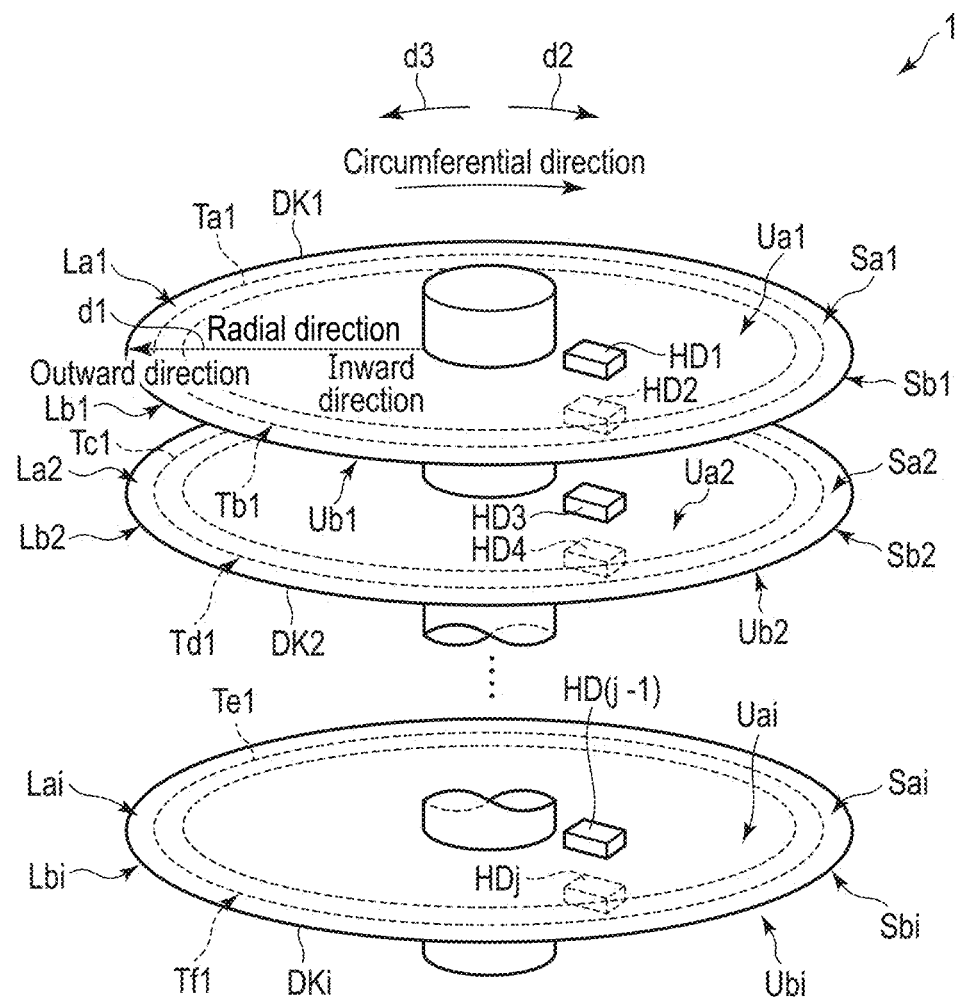
F I G. 2

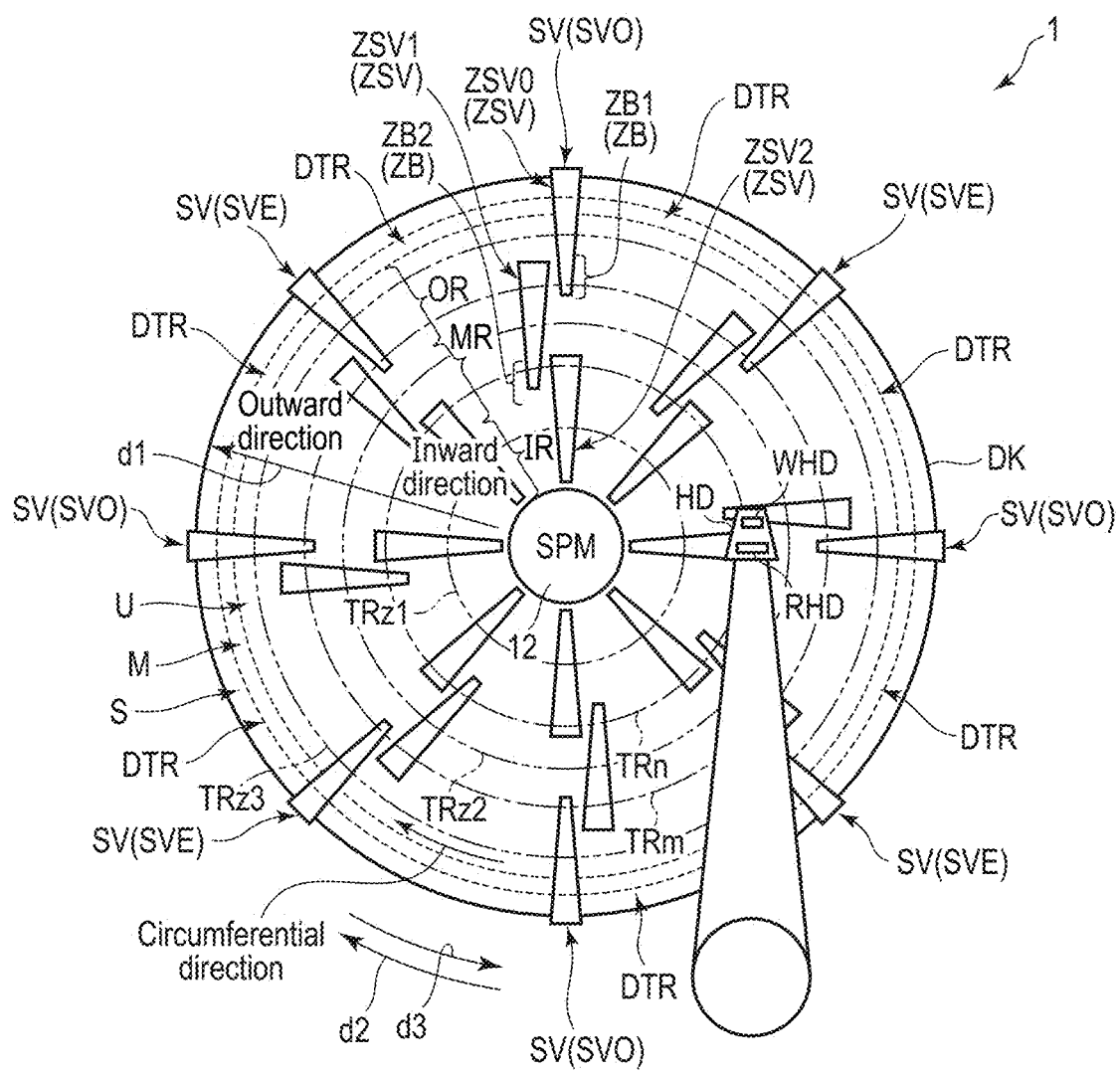
F I G. 3

MAGNETIC DISK DEVICE

CROSS-REFERENCE TO RELATED APPLICATIONS

This application is based upon and claims the benefit of priority from Japanese Patent Application No. 2024-020342, filed Feb. 14, 2024, the entire contents of which are incorporated herein by reference.

FIELD

Embodiments described herein relate generally to a magnetic disk device.

BACKGROUND

Magnetic disk devices such as a Conventional Magnetic Recording (CMR) (or conventional recording) magnetic disk device that writes data to a plurality of tracks at intervals in the radial direction of the disk, a Shingled Magnetic Recording (SMR) or Shingled Write Recording (SWR) magnetic disk device that overwrites data to a plurality of tracks in the radial direction of the disk, and a hybrid recording type magnetic disk device that selectively performs the conventional magnetic recording and the shingled magnetic recording are known.

BRIEF DESCRIPTION OF THE DRAWINGS

FIG. 1 is a block diagram showing a configuration of a magnetic disk device according to an embodiment.

FIG. 2 is a perspective view showing parts of the magnetic disk device, illustrating a plurality of disks and a plurality of heads.

FIG. 3 is a schematic diagram showing an example of the arrangement of a plurality of servo areas and a plurality of data areas on a single disk according to the embodiment.

DETAILED DESCRIPTION

Figure 4:
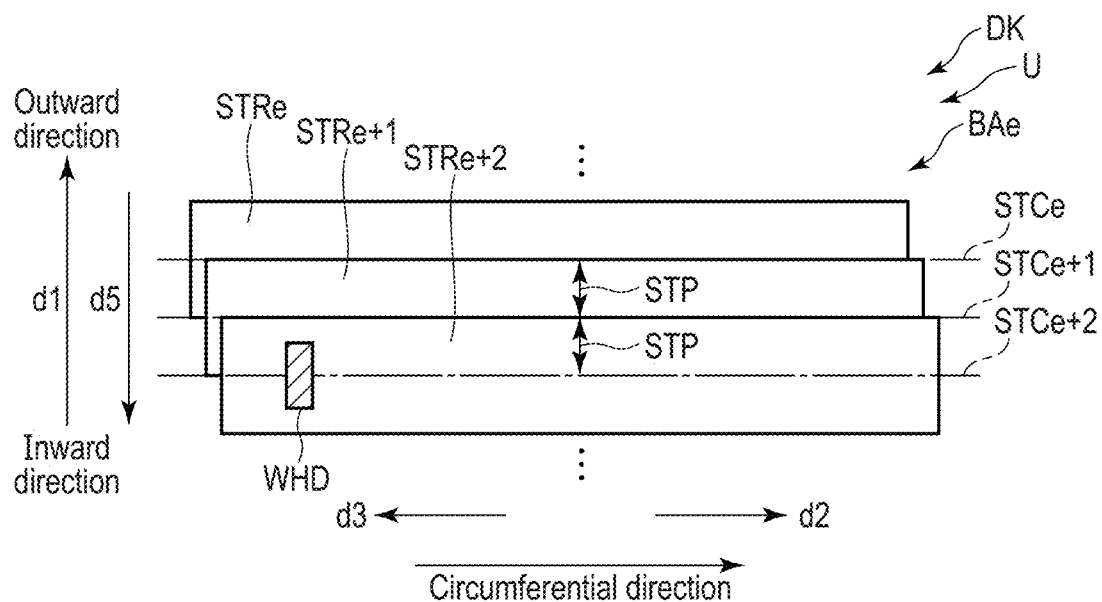
FIG. 4 is a schematic diagram showing three tracks in the user data area where the shingled magnetic recording processing of the disk shown in FIG. 3 is performed, and the write head.

In general, according to one embodiment, there is provided a magnetic disk device comprising: a disk having a plurality of bands each including a plurality of tracks, each of the plurality of tracks including a plurality of sectors; a write head writing data to the disk; a write processing unit selecting shingled magnetic recording of overwriting data to the plurality of tracks in an overwrite direction parallel to a radial direction of the disk, and causing the write head to write data to each of the plurality of bands; a determination unit determining whether a quality-degraded recording sector in which quality of recorded data is lower than a reference level exists in all recording sectors to which data is written, in each of the plurality of bands; and a refresh processing unit, if it is determined that a target band including the quality-degraded recording sector exists in the plurality of bands, reading target data of a plurality of target recording sectors, which is a target of refresh, among all the recording sectors of the target band, rewriting target data to the plurality of target recording sectors, and refreshing the plurality of target recording sectors. The plurality of target recording sectors include the quality-degraded recording sector. In the target band, the number of the plurality of target recording sectors is less than the number of all the recording sectors.

Embodiment

A magnetic disk device 1 according to an embodiment will be described hereinafter with reference to the accompanying drawings. First, a configuration of the magnetic disk device 1 will be described. FIG. 1 is a block diagram showing the configuration of the magnetic disk device 1 according to the embodiment. In the embodiment, the magnetic disk device 1 is a hybrid recording type magnetic disk device that selects and executes the conventional magnetic recording or the shingled magnetic recording. However, the technology to be described below may be applied to a shingled magnetic recording type magnetic disk device.

As shown in FIG. 1, the magnetic disk device 1 comprises a plurality of, for example, one to ten disks (magnetic disks) DK serving as recording media, a spindle motor (SPM) 20 serving as a drive motor, a head stack assembly 22, a driver IC 120, a head amplifier integrated circuit (hereinafter referred to as a head amplifier IC or preamplifier) 130, a volatile memory 70, a buffer memory (buffer) 80, a non-volatile memory 90, and a system controller 110 that is a single-chip integrated circuit. In addition, the magnetic disk device 1 is connected to a host system (hereinafter simply referred to as a host) 100.

Each of the disks DK is formed to have a diameter of, for example, 97 mm (3.8 inches) and has recording layers (magnetic recording layers) on both sides. Incidentally, in the present embodiment, the magnetic disk device 1 comprises one to eleven disks DK, but the number of disks DK is not limited to this.

The head stack assembly 22 can control the movement of the head HD mounted on an arm 30 to a target position on the disk DK by driving of a voice coil motor (hereinafter referred to as VCM) 24, i.e., can seek the head HD.

On the disk DK, a user data area U that can be used for the user, and a system area S where information necessary for the system management is written are assigned to an area where the data can be written.

The head HD records and reads the information on and from the disk DK. The head HD comprises a write head WHD and a read head RHD that are mounted on a slider as a main body. The write head WHD writes the data to a recording layer on the disk DK. The read head RHD reads data from data tracks of the recording layer on the disk DK.

The driver IC 120 controls driving the SPM 20 and the VCM 24 under control of the system controller 110 (more specifically, MPU 60 to be described later). The SPM 20 supports and rotates the plurality of disks DK.

The head amplifier IC 130 comprises a read amplifier and a write driver. The read amplifier amplifies read signals read from the disk DK and outputs the amplified read signals to the system controller 110 (more specifically, a read/write (R/W) channel 140 to be described later). The write driver outputs a write current corresponding to the signals output from the R/W channel 140 to the head HD.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The buffer memory 80 is a semiconductor memory which temporarily records data and the like transmitted and received between the magnetic disk device 1 and the host 100. Incidentally, the buffer memory 80 may be configured integrally with the volatile memory 70. The buffer memory 80 is, for example, a DRAM, a static random access memory (SRAM), an SDRAM, a ferroelectric random access memory (FeRAM), a magnetoresistive random access memory (MRAM) or the like.

The buffer memory 80 comprises a cache 81. The cache 81 includes a first area used as a read cache and a second area used as a write cache, and temporarily stores commands and the like, which are received from the host 100. The first area of the cache 81 temporarily stores read commands received from the host 100. The second area of the cache 81 temporarily stores write data including write commands received from the host 100 and user data corresponding to the above write commands.

The nonvolatile memory 90 is a semiconductor memory which records data stored even when power supply is cut off. The nonvolatile memory 90 is, for example, a NOR type or NAND type flash ROM (flash read only memory: FROM).

The system controller (controller) 110 is realized by, for example, using a large scale integrated circuit (LSI) referred to as a system-on-a-chip (SoC) in which a plurality of elements are integrated on a single chip. The system controller 110 includes a read/write (R/W) channel 140, a hard disk controller (HDC) 150, and a microprocessor (MPU) 60. The system controller 110 is electrically connected to the driver IC 120, the head amplifier IC 130, the volatile memory 70, the buffer memory 80, the nonvolatile memory 90, and the host 100.

The R/W channel 140 executes signal processing of read data transferred from the disk DK to the host 100 and write data transferred from the host 100 in accordance with instructions from the MPU 60 to be described later. The R/W channel 140 comprises a circuit or function of modulating the write data. In addition, the R/W channel 140 comprises a circuit or function of measuring the signal quality of the read data. The R/W channel 140 is electrically connected to, for example, the head amplifier IC 130, the HDC 150, the MPU 60 and the like.

The HDC 150 controls data transfer between the host 100 and the R/W channel 140 in response to instructions from the MPU 60 to be described later. The HDC 150 is electrically connected to, for example, the R/W channel 140, the MPU 60, the volatile memory 70, the buffer memory 80, the nonvolatile memory 90, and the like.

The MPU 60 is a control unit or main controller which controls each of units of the magnetic disk device 1. The MPU 60 controls the VCM 24 via the driver IC 120 to execute servo control for positioning the head HD. The MPU 60 controls the operation of writing the data to the disk DK and selects a storage destination of the write data transferred from the host 100. In addition, the MPU 60 controls the operation of reading the data from the disk DK and controls the processing of the read data transferred from the disk DK to the host 100. The MPU 60 is connected to each unit of the magnetic disk device 1. The MPU 60 is electrically connected to, for example, the driver IC 120, the R/W channel 140, the HDC 150 and the like.

The MPU 60 comprises a read/write processing unit 61, a determination unit 62, a refresh processing unit 63, a counter 64, a command execution unit 65, a detection unit 66, and the like. The MPU 60 executes processing of each of these units, for example, the read/write processing unit 61, the determination unit 62, the refresh processing unit 63, the counter 64, the command execution unit 65, the detection unit 66, and the like on firmware. Incidentally, the MPU 60 may comprise each of these units as a circuit.

The read/write processing unit 61 includes a write processing unit 61a and a read processing unit 61b. In accordance with commands from the host 100, the write processing unit 61a controls the data write processing, and the read processing unit 61b controls the data read processing, causing the read head RHD to execute reading the data from the disk DK. The read/write processing unit 61 controls the VCM 24 via the driver IC 120, positions the head HD at a target position (predetermined radial position) on the disk DK, and executes the read processing or the write processing.

FIG. 2 is a perspective view showing parts of the magnetic disk device 1, illustrating a plurality of disks DK and a plurality of heads HD.

As shown in FIG. 2, a direction of rotation of the disks DK in the circumferential direction is referred to as a rotation direction d3. Incidentally, in the example shown in FIG. 2, the rotation direction is illustrated as a counterclockwise direction, but may be an opposite (clockwise) direction. In addition, the traveling direction d2 of the heads HD relative to the disks DK is opposite to the rotation direction d3. The traveling direction d2 is the direction in which the heads HD sequentially write data to and read data from the disks DK in the circumferential direction, i.e., the direction in which the heads HD travel with respect to the disks DK in the circumferential direction.

The magnetic disk device 1 comprises i disks, i.e., disk DK1 to disk DKi, and j heads, i.e., head HD1 to head HDj. In the present embodiment, the number of heads HD is twice the number of disks DK (j=2× i).

The disks DK1 to DKi are provided coaxially to overlap with from each other at intervals. The diameters of the disks DK1 to DKi are the same as each other. In this example, the terms "same", "identical", "matching", "equivalent" and the like imply not only the meaning of being exactly the same, but also the meaning of being different to the extent that they can be regarded as substantially the same. Incidentally, the diameters of the disks DK1 to DKi may be different from each other.

Each of the disks DK has recording layers L on both sides. For example, the disk DK1 has a first recording layer La1 and a second recording layer Lb1 on a side opposite to the first recording layer La1. The disk DK2 has a first recording layer La2 and a second recording layer Lb2 on a side opposite to the first recording layer La2. The disk DKi has a first recording layer Lai and a second recording layer Lbi on a side opposite to the first recording layer Lai. Each first recording layer La may be referred to as a front surface or a recording surface. Each second recording layer Lb may be referred to as a back surface or recording surface.

Each recording layer L includes a user data area U and a system area S. The first recording layer La1 includes a user data area Ua1 and a system area Sa1. The second recording layer Lb1 includes a user data area Ub1 and a system area Sb1. The first recording layer La2 includes a user data area Ua2 and a system area Sa2. The second recording layer Lb2 includes a user data area Ub2 and a system area Sb2. The first recording layer Lai includes a user data area Uai and a system area Sai. The second recording layer Lbi includes a user data area Ubi and a system area Sbi.

A track sandwiched between double dashed lines in the drawing, of the user data area Ua1 (first recording layer La1), is referred to as a track Ta1. A track located on a side opposite to the track Ta1, of the user data area Ub1 (second recording layer Lb1), is referred to as a track Tb1.

A track sandwiched between double dashed lines in the figure, of the user data area Ua2 (first recording layer La2), is referred to as a track Tc1. A track located on a side opposite to the track Tc1, of the user data area Ub2 (second recording layer Lb2), is referred to as a track Td1.

A track sandwiched between double dashed lines in the figure, of the user data area Uai (first recording layer Lai), is referred to as a track Te1. A track located on a side opposite to the track Te1, of the user data area Ubi (second recording layer Lbi), is referred to as a track Tf1.

In the present embodiment, the tracks Ta1, Tb1, Tc1, Td1, Te1, and Tf1 are located on the same cylinder.

The heads HD are opposed to the disks DK. In the present embodiment, one head HD is opposed to each recording layer L of the disk DK. For example, the head HD1 is opposed to the first recording layer La1 of the disk DK1, writes the data to the first recording layer La1, and reads the data from the first recording layer La1. The head HD2 is opposed to the second recording layer Lb1 of the disk DK1, writes the data to the second recording layer Lb1, and reads the data from the second recording layer Lb1.

The head HD3 is opposed to the first recording layer La2 of the disk DK2, writes the data to the first recording layer La2, and reads the data from the first recording layer La2. The head HD4 is opposed to the second recording layer Lb2 of the disk DK2, writes the data to the second recording layer Lb2, and reads the data from the second recording layer Lb2. The head HDj−1 is opposed to the first recording layer Lai of the disk DKi, writes the data to the first recording layer Lai, and reads the data from the first recording layer Lai. The head HDj is opposed to the second recording layer Lbi of the disk DKi, writes the data to the second recording layer Lbi, and reads the data from the second recording layer Lbi.

FIG. 3 is a schematic diagram showing an example of the arrangement of a plurality of servo areas SV and a plurality of data areas DTR on a single disk DK according to the present embodiment. As shown in FIG. 3, a direction toward the outer circumference of the disk DK in the radial direction d1 of the disk DK is referred to as an outward direction (outside), and a direction opposite to the outward direction is referred to as an inward direction (inside).

In FIG. 3, the user data area U is divided into an inner circumferential area IR located in the inward direction, an outer circumferential area OR located in the outward direction, and an intermediate circumferential area MR located between the inner circumferential area IR and the outer circumferential area OR.

The disk DK includes a plurality of servo areas SV and a plurality of data areas DTR. For example, the plurality of servo areas SV may extend radially in the radial direction of the disk DK and may be discretely arranged at predetermined intervals in the circumferential direction. For example, the plurality of servo areas SV may extend linearly from the inner circumference to the outer circumference and may be discretely arranged at predetermined intervals in the circumferential direction. For example, the plurality of servo areas SV may extend in a spiral shape from the inner circumference to the outer circumference and may be discretely arranged at predetermined intervals in the circumferential direction. Alternatively, for example, the plurality of servo areas SV may be arranged in a shape of islands in the radial direction and may be discretely arranged at different predetermined intervals in the circumferential direction.

In the following descriptions, one servo area SV on a predetermined track may be referred to as a "servo sector". Incidentally, the "servo area SV" may be referred to as a "servo sector SV". The servo sector includes servo data. In the following descriptions, the "arrangement of several servo data elements constituting the servo sector, and the like" may be referred to as a "servo pattern". Incidentally, the "servo data written to the servo sector" may be referred to as the "servo sector".

Each of the plurality of data areas DTR is arranged between the plurality of servo areas SV. For example, the data area DTR corresponds to an area between two continuous servo areas SV in the circumferential direction. In the following descriptions, one data area DTR on a predetermined track may be referred to as a "data sector". Incidentally, the "data area DTR" may be referred to as a "data sector DTR". The data sector includes user data. Incidentally, the "user data written to the data sector" may be referred to as the "data sector". The "data sector" may be referred to as the "user data". In addition, a "pattern composed of several data elements" may be referred to as a "data pattern". In the example shown in FIG. 3, the data pattern on a predetermined track is composed of a plurality of servo data (servo sectors) and a plurality of user data (data sectors).

The servo area SV includes a plurality of zone servo areas ZSV and the like. Incidentally, the servo area SV may include an area including a gap (i.e., displacement between circumferential positions of two zone servo areas), an area including the servo data, the data area DTR, and the like, in addition to the zone servo areas ZSV. The plurality of zone servo areas ZSV are discretely arranged in the radial direction. Each of the zone servo areas ZSV extends in the radial direction.

One zone servo area (servo area) ZSV in a predetermined track may be referred to as a "zone servo sector" or "servo sector". Incidentally, the "zone servo area (servo area) ZSV" may be referred to as a "zone servo sector ZSV" or "servo sector ZSV". The "servo data written to the zone servo sector" may be referred to as the "zone servo sector" or "servo sector". In the following descriptions, the "arrangement of several servo data constituting the zone servo sector" may be referred to as a "zone servo pattern" or "servo pattern". In the following descriptions, one servo area SV on a predetermined track may be referred to as a "zone pattern sector".

Incidentally, the "servo area SV" may be referred to as the "zone pattern sector". In this example, "at least one data element and the like written to the zone pattern sector" may be referred to as the "zone pattern sector". The zone pattern sector includes at least one zone servo sector. In the following descriptions, the "data pattern of the zone pattern sector" may be referred to as a "zone data pattern".

In the example shown in FIG. 3, the servo areas SV include zone servo areas ZSV0, ZSV1, and ZSV2. The zone servo areas ZSV0, ZSV1, and ZSV2 are arranged in a staggered pattern in the radial direction. The zone servo areas ZSV0, ZSV1, and ZSV2 may be arranged stepwise in the radial direction.

The zone servo area ZSV2 is located on the inner circumferential side than the zone servo area ZSV1. The zone servo area ZSV0 is located on the outer circumferential side than the zone servo area ZSV1. For example, the zone servo area ZSV2 is arranged from the inner circumferential area IR to the intermediate circumferential area MR, the zone servo area ZSV1 is arranged from the inner circumferential area IR to the outer circumferential area OR, and the zone servo area zSVO is arranged from the intermediate circumferential area MR to the outer circumferential area OR. In the following descriptions, a predetermined area in the radial direction in which the plurality of zone servo areas ZSV are arranged in the circumferential direction, in a predetermined servo area SV, may be referred to as a zone servo boundary area, a double servo area, or a double zone servo area ZB.

In the example shown in FIG. 3, the main servo areas SVO and the sub-servo areas SVE are alternately arranged at intervals in the circumferential direction. For example, one sub-servo area SVE is arranged between two main servo areas SVO that are continuously aligned at an interval in the circumferential direction. In other words, one sub-servo area SVE is arranged between two main servo areas SVO that are continuously aligned at an interval in the circumferential direction. For example, when all the servo areas SV of the disk DK are assigned continuous numbers in order, the main servo areas SVO correspond to the odd-numbered servo areas SV, and the sub-servo areas SVE correspond to the even-numbered servo areas SV. Incidentally, two or more sub-servo areas SVE may be arranged between two main servo areas SVO that are continuously aligned at an interval, in the circumferential direction.

The main servo areas SVO and the sub-servo areas SVE may be composed of, for example, only servo areas (hereinafter often referred to as normal servo areas) that read and demodulate the servo data as a whole. In the following descriptions, "reading and demodulating the servo data" may be referred to as "servo-reading". The main servo areas SVO and the sub-servo areas SVE may be composed of, for example, the normal servo areas, and servo areas (hereinafter often referred to as short servo areas) where servo-reading is performed in a smaller circumferential range of the servo data than a circumferential range of the servo data to be servo-read in the normal servo areas.

A media cache M is allocated to the disk DK. However, the media cache M may not be arranged on the disk DK.

By using the plurality of servo data described above, for example, the head HD can be positioned such that a predetermined amount of off-track can obtained.

In the present embodiment, the example in which the number of zones on the disk DK is three has been described, but the number of zones on the disk DK can be changed variously. The number of zones on the disk DK may be thirty to forty. In addition, each zone has a plurality of bands. For example, each zone has several hundreds of bands.

FIG. 4 is a schematic diagram showing three tracks STR of the user data area U where the shingled magnetic recording processing of the disk DK shown in FIG. 3 is performed, and the write head WHD. The user data area U is a shingled magnetic recording area. Sequentially writing the data in band units is permitted, i.e., shingled magnetic recording is permitted, in the user data area U.

As shown in FIG. 4, the write head WHD can sequentially write the data to the disk DK in the traveling direction d2. The read head RHD shown in FIG. 3 can also sequentially read the data written to the disk DK in the traveling direction d2.

A direction in which shingled magnetic recording is sequentially performed on a plurality of tracks STR in the direction parallel to the radial direction d1, i.e., a direction of making a track STR in which data is to be next written overwrap with a track STR in which data is previously written in the radial direction d1, is referred to as an overwrite direction or recording progress direction. In a band BAe shown in FIG. 4, an overwrite direction d5 is an inward direction, but the overwrite direction may be an outward direction.

For example, an overwrite direction applied to a plurality of bands BA (plurality of zones Z) located on an outer circumference side than a specific radial position and an overwrite direction applied to a plurality of bands BA (plurality of zones Z) located on an inner circumferential side than the specific radial position may be opposite to each other.

The band BAe includes a plurality of tracks STR including tracks STRe, STRe+1, and STRe+2. The tracks STRe, STRe+1, and STRe+2 are sequentially overwritten in the overwrite direction d5 in the order described above. The track STRe among the tracks STRe, STRe+1, and STRe+2 corresponds to the track where data is first written, and the track STRe+2 corresponds to the track where data is last written.

The track STRe includes a track center STCe at the center of the radial direction d1 when no other tracks are overwritten. The track STRe+1 includes a track center STCe+1 at the center of the radial direction d1 when no other tracks are overwritten. The track STRe+2 includes a track center STCe+2 at the center of the radial direction d1 when no other tracks are overwritten.

In the example shown in FIG. 4, the tracks STRe, STRe+1, and STRe+2 are written at a pitch (shingled magnetic recording track pitch) STP. The track center STCe of the track STRe and the track center STCe+1 of the track STRe+1 are separated by the pitch STP in the radial direction d1. The track center STCe+1 of the track STRe+1 and the track center STCe+2 of the track STRe+2 are separated by the pitch STP in the radial direction d1. The tracks STRe to STRe+2 may be written at different pitches.

A width in the radial direction d1 of the area of the track STRe where the track STRe+1 is not overwritten and a width in the radial direction d1 of the area of the track STRe+1 where the track STRe+2 is not overwritten are the same as each other.

Incidentally, the width in the radial direction d1 of the area of the track STRe where the track STRe+1 is not overwritten and the width in the radial direction d1 of the area of the track STRe+1 where the track STRe+2 is not overwritten may be different from each other.

In FIG. 4, each track STR has a rectangular shape for convenience of description but, in reality, each track STR is curved along the circumferential direction. In addition, each track STR may have a wave shape extending in the circumferential direction while changing in the radial direction d1. Incidentally, three tracks STR are overwritten in FIG. 4, but two tracks STR may be overwritten or more than three tracks STR may be overwritten.

The write processing unit 61a can select the shingled magnetic recording system of overwriting the data on a plurality of tracks STR in the overwrite direction d5 and cause the write head WHD to write the data to each of the bands BA. In the example shown in FIG. 4, the write processing unit 61a sequentially performs the shingled magnetic recording of the tracks STRe to STRe+2 in the band BAe at the pitch STP in the inward direction (overwrite direction d5). Since the user data area U is the area where the data is written in the shingled magnetic recording, the recording density of the user data area U can be improved.

The write processing unit 61a writes the track STRe+1 at the pitch STP in the inward direction of the track STRe and overwrites the track STRe+1 to a portion of the inner circumference side of the track STRe. The write processing unit 61a writes the track STRe+2 at the pitch STP in the inward direction of the track STRe+1 and overwrites the track STRe+2 to a portion of the inner circumference side of the track STRe+1.

Figure 5:
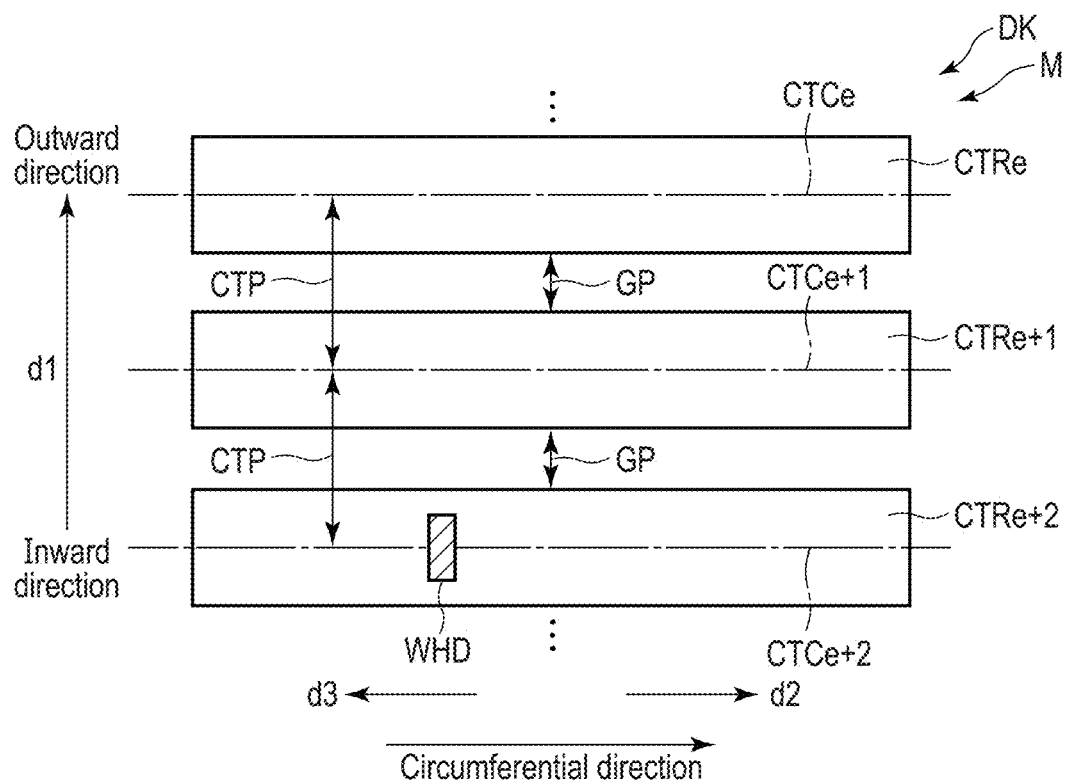
FIG. 5 is a schematic diagram showing three tracks of a media cache where the conventional magnetic recording processing on the disk shown in FIG. 3 is performed, and the write head.

FIG. 5 is a schematic diagram showing three tracks CTR of the media cache M where the conventional magnetic recording processing of the disk DK shown in FIG. 3 is performed, and the write head WHD. The media cache M and the system area S shown in FIG. 3 are conventional magnetic recording areas. In the media cache M and the system area S, writing the data at random is permitted, i.e., conventional magnetic recording is permitted.

As shown in FIG. 5, the media cache M includes a plurality of tracks CTR including the tracks CTRe, CTRe+1, and CTRe+2. For example, the widths (track widths) in the radial direction d1 of the tracks CTRe, CTRe+1, and CTRe+2 are the same as each other. Incidentally, the track widths of the tracks CTRe to CTRe+2 may be different from each other.

The track CTRe has a track center CTCe at the center of the radial direction d1, the track CTRe+1 has a track center CTCe+1 at the center of the radial direction d1, and the track CTRe+2 has a track center CTCe+2 at the center of the radial direction d1. In the example shown in FIG. 5, the tracks CTRe, CTRe+1, and CTRe+2 are written at the pitch (conventional magnetic recording track pitch) CTP. The track center CTCe of the track CTRe and the track center CTCe+1 of the track CTRe+1 are separated by the pitch CTP. The track center CTCe+1 of the track CTRe+1 and the track center CTCe+2 of the track CTRe+2 are separated by the pitch CTP.

The track CTRe and the track CTRe+1 are separated from each other with a gap GP. The track CTRe+1 and the track CTRe+2 are separated from each other with the gap GP. Incidentally, the data may be written to the tracks CTRe to CTRe+2 at pitches different from each other. In FIG. 5, each track CTR has a rectangular shape for convenience of description but, in reality, each track CTR is curved along the circumferential direction. In addition, each track CTR may have a wave shape extending in the circumferential direction while changing in the radial direction d1.

The write processing unit 61a can execute write processing by selecting a conventional magnetic recording of writing the data to a plurality of tracks CTR spaced apart in the radial direction d1 of the disk DK. In the example shown in FIG. 5, the write processing unit 61a positions the write head WHD at the track center CTCe in a predetermined area of the disk DK and performs conventional magnetic recording on the track CTRe or a predetermined sector of the track CTRe.

The write processing unit 61a positions the write head WHD at track center CTCe+1, which is separated from the track center CTCe of the track CTRe in the inner direction by the pitch CTP, and performs the conventional magnetic recording on the track CTRe+1 or a predetermined sector of the track CTRe+1. The write processing unit 61a positions the write head WHD at track center CTCe+2, which is separated from the track center CTCe+1 of the track CTRe+1 in the inner direction by the pitch CTP, and performs the conventional magnetic recording on the track CTRe+2 or a predetermined sector of the track CTRe+2.

The write processing unit 61a may sequentially perform the conventional magnetic recording in the tracks CTRe, CTRe+1, and CTRe+2, in a predetermined area of the disk DK, or may randomly perform the conventional magnetic recording in a predetermined sector of the track CTRe, a predetermined sector of the track CTRe+1, and a predetermined sector of the track CTRe+2.

Figure 6:
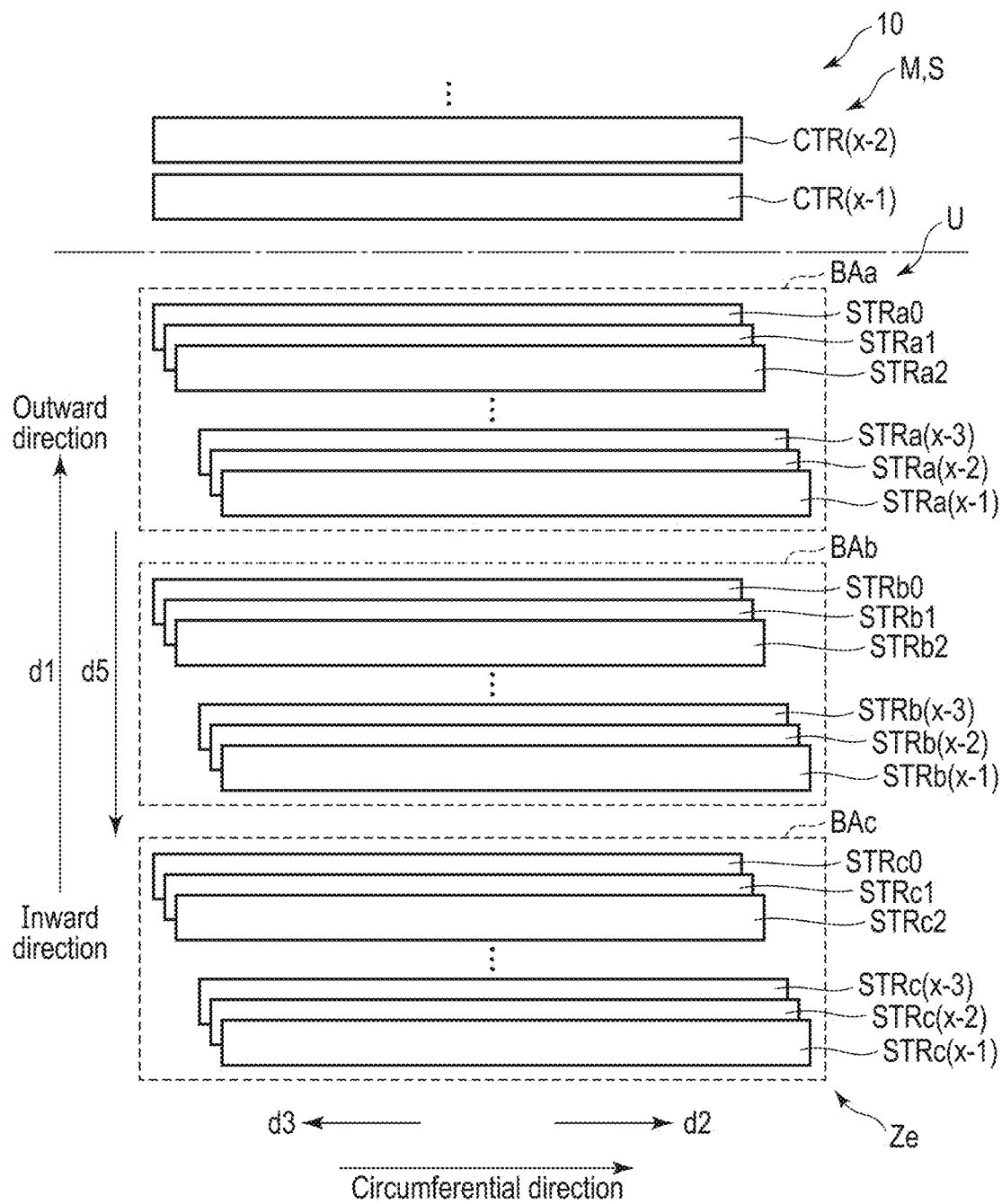
FIG. 6 is a schematic diagram showing an example of data write processing on the disk.

FIG. 6 is a schematic diagram showing an example of the data write processing on the disk DK. As shown in FIG. 6, the user data area U includes the bands BAa, BAb, and BAc. The bands BAa, BAb, and BAc belong to the same zone Ze. In the zone Ze, the bands BAa, BAb, and BAc are intermittently arranged in the overwrite direction in the order described above.

The bands BAa and BAb are adjacent to each other in the radial direction d1, and the bands BAb and BAc are adjacent to each other in the radial direction d1.

The band BAa includes x tracks such as tracks STRa0, STRa1, STRa2, . . . , STRa(x−3), STRa(x−2), and STRa(x−1). The tracks STRa0 to STRa(x−1) are subjected to the shingled magnetic recording in the overwrite direction d5 in the order of these descriptions. In the band BAa, the track STRa0 corresponds to a first track where the data is first written, and the track STRa(x−1) corresponds to the last track where the data is last written.

The band BAb includes x tracks such as tracks STRb0, STRb1, STRb2, STRb(x−3), STRb(x−2), and STRb(x−1). The tracks STRb0 to STRb(x−1) are subjected to the shingled magnetic recording in the overwrite direction d5 in the order of these descriptions. In the band BAb, the track STRb0 corresponds to a first track where the data is first written, and the track STRb(x−1) corresponds to the last track where the data is last written.

The band BAc includes tracks STRC0, STRc1, STRc2, STRc(x−3), STRc(x−2), and STRc(x−1). The tracks STRc0 to STRc(x−1) are subjected to the shingled magnetic recording in the overwrite direction d5 in the order of these descriptions. In the band BAc, the track STRc0 corresponds to a first track where the data is first written, and the track STRc(x−1) corresponds to the last track where the data is last written.

The number of the tracks STR included in each of the bands BA belonging to the same zone Z is the same. For example, the number of the tracks STR included in each of the bands BA belonging to the zone Ze is the same. In other words, the number of the tracks STR included in the band BA is fixed for each zone Z. In this example, the number of the tracks STR included in each of the bands BA belonging to the zone Ze is x.

FIG. 6 shows tracks CTR(x−2) and CTR(x−1). In FIG. 6, the tracks CTR(x−2) and CTR(x−1) are subjected to the conventional magnetic recording in the media cache M or the system area S. The tracks CTR(x−2) and CTR(x−1) are adjacent to each other in the radial direction d1.

Figure 7:
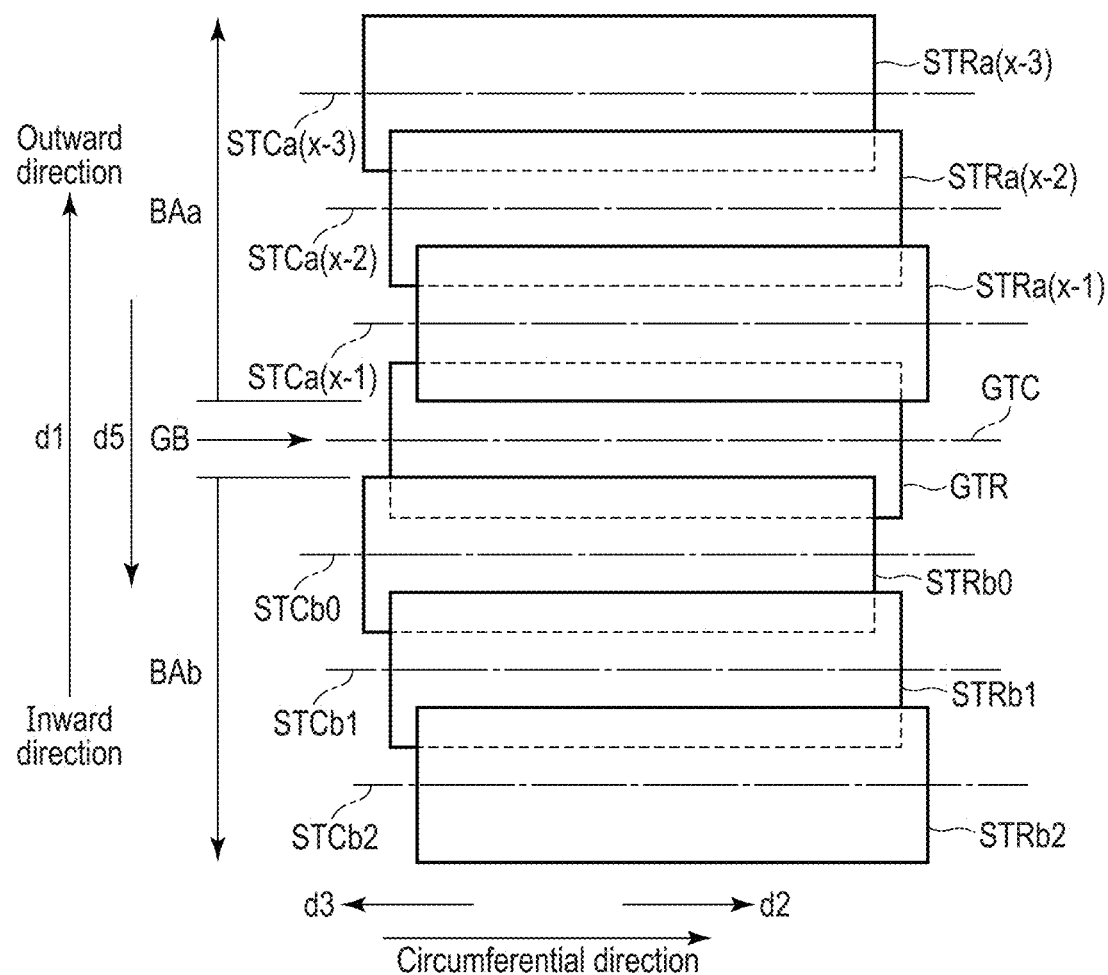
FIG. 7 is a schematic diagram showing two bands and one guard band in the user data area shown in FIG. 6.

FIG. 7 is a schematic diagram showing two bands BAa and BAb and one guard band GB of the user data area U shown in FIG. 6. As shown in FIG. 7, in the shingled magnetic recording, unlike the conventional magnetic recording, the MPU 60 manages a group of tracks in the user data area U in units referred to as bands, with the feature of overwriting the data to a part of the track STR.

A guard band GB is generally provided between the bands BA adjacent in the radial direction d1. The guard band GB includes a guard track GTR. Unlike the present embodiment, the guard band GB may include a plurality of guard tracks GTR. The guard band GB has a role of suppressing interference between adjacent bands BA. The shingled magnetic recording can be performed in units of one band BA by the guard band GB. In addition, the ranges (bands BA) where the data is sequentially written can be separated by the guard band GB.

For example, the track center STCa(x−3) of the track STRa(x−3), the track center STCa(x−2) of the track STRa(x−2), the track center STCa(x−1) of the track STRa(x−1), the track center GTC of the guard track GTR, the track center STCb0 of the track STRb0, the track center STCb1 of the track STRb1, and the track center STCb2 of the track STRb2, are located at equal pitch in the overwrite direction d5.

The recording capacity of each band BA in the user data area U is usually predetermined based on the specifications required by the user, except the guard band GB. The MPU 60 can record the same capacity of data in each band BA. In general, the recording capacity of each band BA is 128 MiB or 256 MiB.

Figure 8:
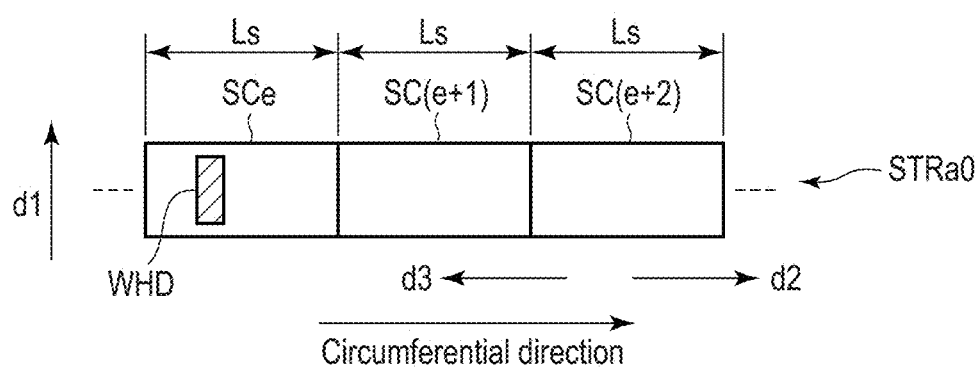
FIG. 8 is a schematic diagram showing three sectors of one track of the band shown in FIG. 6.

FIG. 8 is a schematic diagram showing three sectors SCe, SC(e+1), and SC(e+2) of one track STRa0 of the band BAa shown in FIG. 6. As shown in FIG. 8, each track STR includes a plurality of sectors SC. The track STRa1 includes a plurality of sectors SC including sectors SCe, SC(e+1), and SC(e+2). The number of sectors SC included in each of the tracks STR belonging to the same zone Z is the same. In the present embodiment, the number of sectors SC included in each of the tracks STR belonging to the zone Ze has is y.

Each sector SC has a length Ls in the circumferential direction of the disk DK.

The write head WHD is a magnetic head for energy-assisted recording that performs energy-assisted magnetic recording (EAMR). Examples of an energy adding method of the energy-assisted magnetic recording include a microwave assisted magnetic recording (MAMR) method and a heat assisted magnetic recording (HAMR) method.

In the MAMR method, an element that generates microwaves (high-frequency magnetic field) by applying an electric current is placed at a distal end of the write head WHD. A medium exposed to the high-frequency magnetic field by the write head WHD that performs the MAMR recording undergoes spin resonance, inverting with a magnetic field weaker than the originally required switching magnetic field. As a result, since pinpoint recording of data can be performed with a smaller write head WHD, the recording density of the disk DK can be improved.

Incidentally, the product life of the write head WHD that performs the MAMR recording becomes shorter as the amount of power supplied to the write head WHD increases. In other words, as the amount of data written to the disk DK increases, the product life of the write head WHD becomes shorter. For this reason, the write head WHD can desirably reduce the amount of data written to the disk DK, from the viewpoint of the product life.

In the present embodiment, the write head WHD is configured to use energy other than the magnetic energy, but the write head WHD may also be a magnetic head that is not configured to perform the energy-assisted recording.

Example 1 of Embodiment

Figure 9:
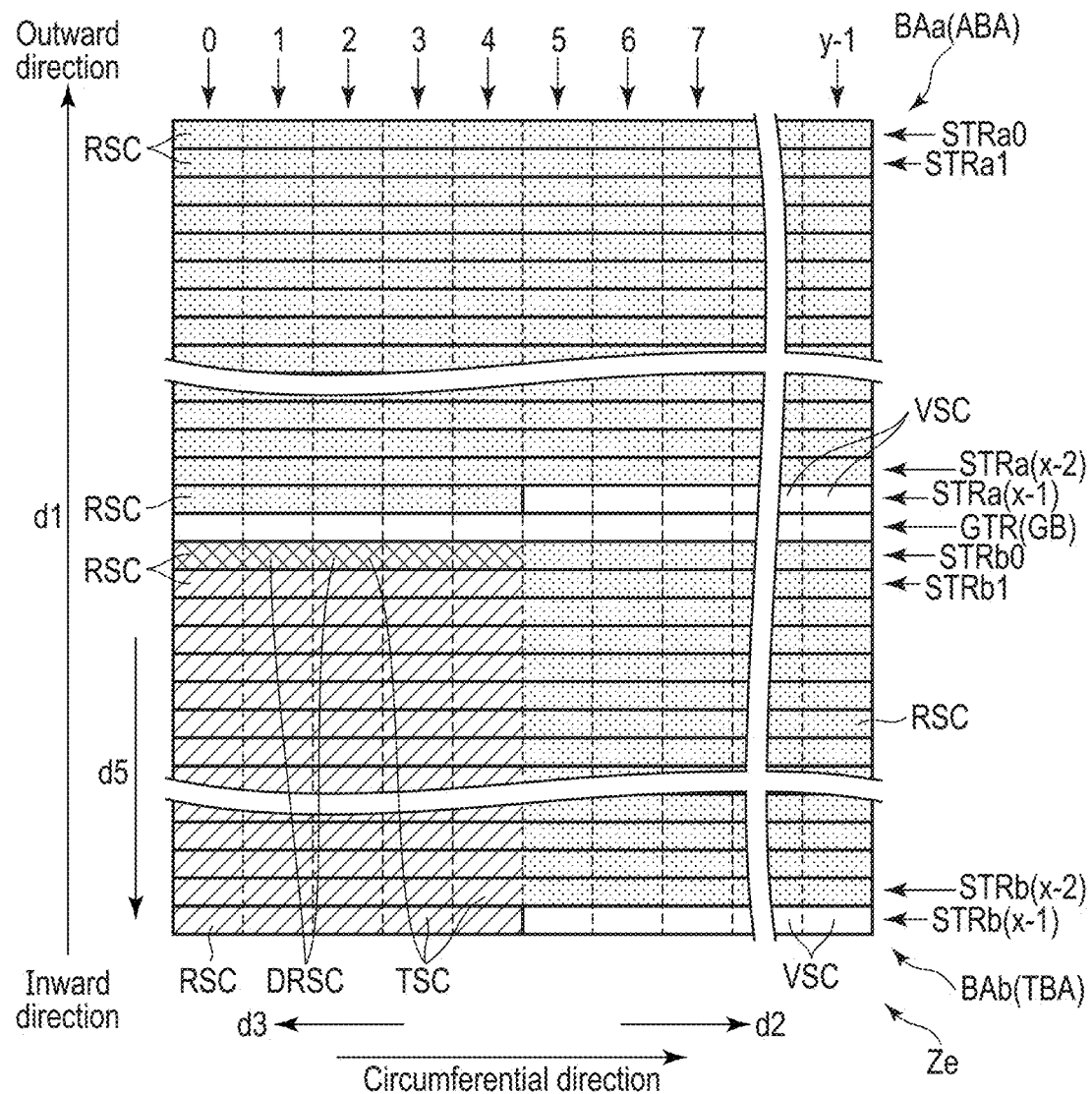
FIG. 9 is a schematic diagram showing two bands and one guard band shown in FIG. 7, illustrating a refresh processing method according to example 1 of the embodiment.

Next, the refresh processing method according to example 1 of the embodiment will be described. FIG. 9 is a schematic diagram showing the two bands BAa and BAb and one guard band GB shown in FIG. 7, illustrating the refresh processing method according to the example 1.

In FIG. 9, each track STR has a rectangular shape for convenience of description but, in reality, each track STR is curved along the circumferential direction. In addition, a plurality of tracks STR are aligned in the overwrite direction d5 without overlapping but, in reality, the plurality of tracks STR are aligned in the overwrite direction d5 while overwrapping.

In the drawing, the recording sector RSC is marked with a dot pattern. Unused sectors VSC are represented by a solid color. The quality-degraded recording sector DRSC, among the recording sectors RSC, is marked with a diagonal grating pattern instead of a dot pattern. A target recording sector TSC, among the recording sectors RSC, is marked with a diagonal line instead of a dot pattern. Incidentally, the quality-degraded recording sector DRSC is also the target recording sector TSC.

As shown in FIG. 9, the band number of the band BAa is "a" and the band number of the band BAb is "b". The track number of each band BA is "0" to "x−1". The sector number of each track STR is "0" to "y−1". In the following descriptions, the sector SC of each band BA may be identified by the following code "SC (track number, sector number)". When the band BA to which a sector SC belongs is identified, each sector SC may be identified by the following code "SC(band number, track number, sector number)".

In the present embodiment, the band BAb is a band which is subjected to the refresh process and is a target band TBA. In contrast, the band BAa is a band adjacent to the band BAb and located above the band BAb in the overwrite direction d5, and is an adjacent band ABA.

The track STRa(x−1) on an end located most closely to the band BAb side, among the plurality of tracks STR in the band BAa, functions as the first track and includes one or more recording sectors RSC to which valid data is written. In addition, the track STRa(x−1) may not include unused sectors VSC to which valid data is not written, but the track STRa(x−1) includes unused sectors VSC similarly to the embodiment.

The track STRb0 on an end located most closely to the band BAa side, among the plurality of tracks STRb in the band BAb, is the track which functions as the second track and to which the data is first written by the shingled magnetic recording, in the band BAb. The track STRb(x−1)

is the track to which the data is last written by the shingled magnetic recording, in the band BAb, and functions as the third track.

In each of the bands BA of the zone Ze, all sectors SC of x−1 tracks STR from number 0 to number x−2 are sectors to which valid data is written, and are recording sectors RSC. Five sectors SC from number 0 to number 4 in the track STR of number x−1 in each band BA of the zone Ze, are sectors to which valid data is written, and are recording sectors RSC. In contrast, remaining sectors SC from number 5 to number y−1, in the track STR of number x−1, are sectors to which valid data is not written, and are unused sectors VSC.

By the way, when data is rewritten to track 1 of the user data area U subjected to the shingled magnetic recording and the track 1 is refreshed, track 2 which is overwritten the track 1 is strongly affected by the adverse effects of write blurring. For this reason, the data needs to be eventually rewritten to all tracks in the same band BA, including the overwritten track 2.

Therefore, since the write time required for the refresh process and the amount of data to be written increase in the shingled magnetic recording as compared to the conventional magnetic recording, the write head WHD tends to be worn severely.

The refresh processing method according to comparative example 1 will be described before the refresh processing method according to example 1.

Figure 10:
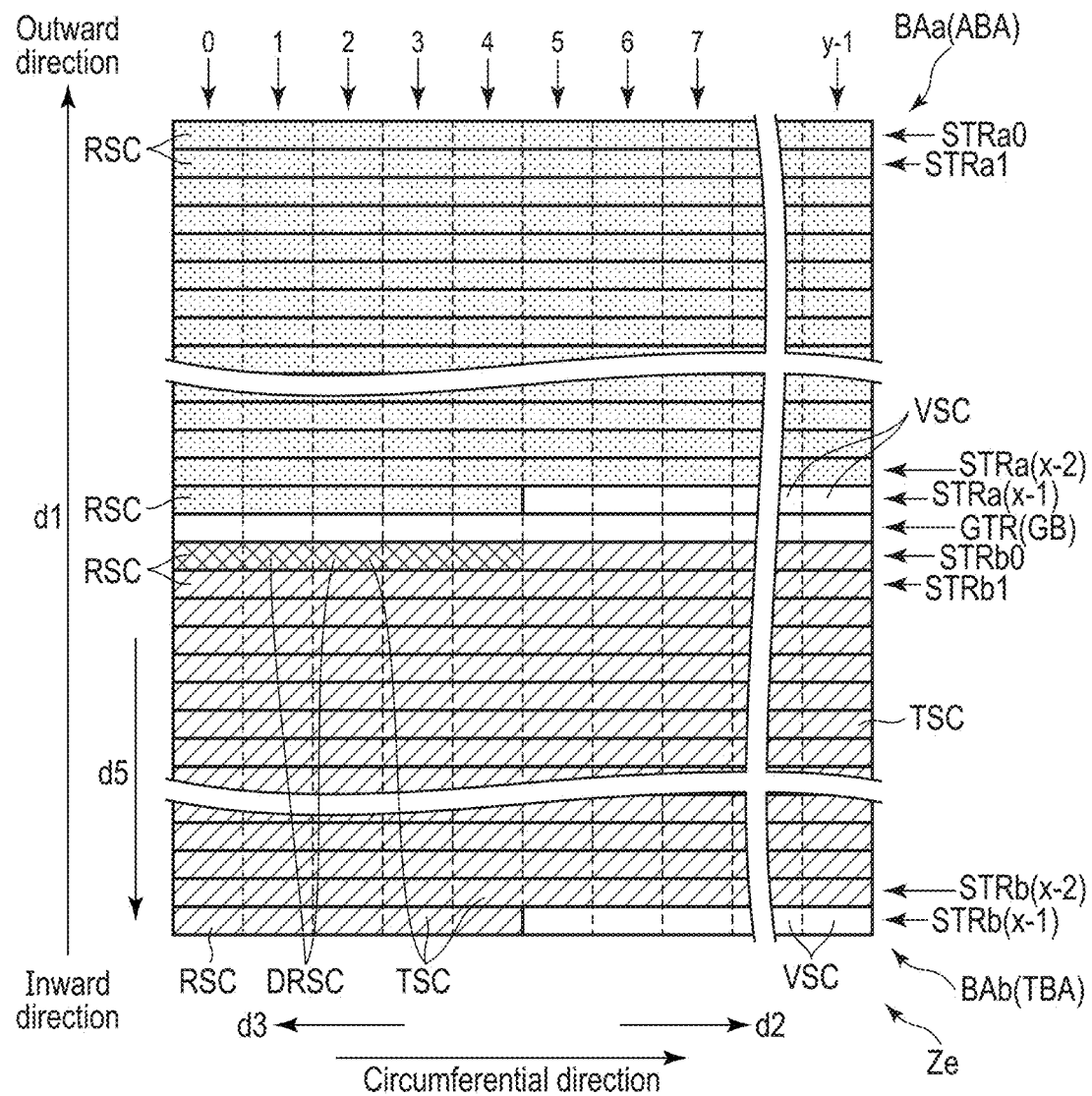
FIG. 10 is a schematic diagram showing two bands and one guard band shown in FIG. 7, illustrating the refresh processing method according to comparative example 1.

As shown in FIG. 10, the recording quality of the data in the band BAb is deteriorated when adversely affected by external disturbances at the time of writing the data to the disk DK, sudden deterioration of positioning of the write head WHD or change in the flying amount of the write head WHD due to Defect, the leakage of magnetic field from the write head WHD at the time of writing the data to the band BAa, and the like.

The adverse effect of the leakage of magnetic field from the write head WHD at the time of writing the data to the band BAa on the band BAb (influence of Adjacent Track Interference; ATI) is the greatest when the data is written to the track STRa(x−1) of the band BAa. In this example, when data is written to the sector SC(a, x−1, 0), sector SC(a, x−1, 1), sector SC(a, x−1, 2), sector SC(a, x−1, 3), and sector SC(a, x−1, 4) of the track STRa(x−1) of the band BAa, the sector SC(b, 0, 0), sector SC(b, 0, 1), sector SC(b, 0, 2), sector SC(b, 0, 3), and sector SC(b, 0, 4) of the track STRb0 of the band BAb are affected most adversely by the leakage of magnetic field. Each of the sectors SC(b, 0, 0) to SC(b, 0, 4) of the track STRb0 can be a quality-degraded recording sector DRSC.

For this reason, the band BAb needs to be subjected to the refresh processing. When the refresh processing is performed for the band BAb, all the recording sectors RSC of the band BAb become target recording sectors TSC, which are subject to refresh. The refresh processing unit 63 can read the target data of the plurality of target recording sectors TSC(all the recording sectors RSC), rewrite the target data to the plurality of target recording sectors TSC, and refresh the plurality of target recording sectors TSC.

In the example in FIG. 10, however, since the amount of data rewritten at the time of refresh of the band BAb cannot be reduced as described above, the write head WHD is worn severely.

Next, the refresh processing method according to the example 1 will be described.

As shown in FIG. 9, when the refresh processing is performed for the band BAb, all the recording sectors RSC of the band BAb are not set as the target recording sectors TSC. The target recording sectors TSC of the band BAb are a plurality of recording sectors RSC aligned in the recording sectors RSC(a, x−1, 0) to RSC(a, x−1, 4) of the track STRa(x−1) of the band BAa in the overwrite direction d5.

In accordance with removing a plurality of recording sectors RSC aligned in the recording sectors RSC(a, x−1, 5) to RSC(a, x−1, y−1) of the track STRa(x−1) in the overwrite direction d5, in the band BAb, from the target recording sectors TSC, the amount of data rewritten at the time of refresh of the band BAb can be reduced, and wear on the write head WHD can be suppressed.

Next, the refresh processing method according to example 1 will be described in detail.

As shown in FIG. 1 and FIG. 9, the determination unit 62 determines whether a quality-degraded recording sector DRSC in which the quality of the recorded data is lower than the reference level exists in all the recording sectors RSC to which the data is written, in each of the bands BA.

If the determination unit 62 determines that the target band TBA including the quality-degraded recording sector DRSC exists in the plurality of bands BA, the refresh processing unit 63 can read the target data of the plurality of target recording sectors TSC that are the targets of refresh among all the recording sectors RSC in the target band TBA (band BAb), rewrite the target data to the plurality of target recording sectors TSC, and refresh the plurality of target recording sectors TSC.

The plurality of target recording sectors TSC include the quality-degraded recording sectors DRSC. In this example, the quality-degraded recording sectors DRSC are five recording sectors RSC, i.e., recording sectors RSC(b, 0, 0) to RSC(b, 0, 4) of the track STRb0. In the target band TBA (band BAb), the number of target recording sectors TSC is less than the number of all the recording sectors RSC. Since the number of the target recording sectors TSC is not equal to the number of all the recording sectors RSC, the amount of data rewritten at the time of refresh of the band BAb can be reduced and the wear on the write head WHD can be suppressed.

In addition, in the target band TBA (band BAb), the plurality of target recording sectors TSC are the plurality of recording sectors RSC aligned in the overwrite direction d5. In the overwrite direction d5, the recording sector RSC aligned with the quality-degraded recording sector DRSC is set as the target recording sector TSC, but the recording sectors RSC not aligned with the quality-degraded recording sector DRSC are not set as the target recording sectors TSC. The target recording sector TSC can be limited (narrowed) from among all the recording sectors RSC in the target band TBA. The amount of data rewritten at the time of refresh of the band BAb can be further reduced, and the wear on the write head WHD can be suppressed.

Furthermore, in the target band TBA (band BAb), the plurality of target recording sectors TSC are the plurality of recording sectors RSC aligned in one or more recording sectors RSC of the track STRa(x−1) in the overwrite direction d5. In this example, in the target band TBA (band BAb), the plurality of target recording sectors TSC are the plurality of recording sectors RSC aligned with the recording sectors RSC(a, x−1, 0) to RSC(a, x−1, 4) in the track STRa(x−1) in the overwrite direction d5. Therefore, the target band TBA (band BAb) can be refreshed in consideration of the adverse effects of ATI from the last track STRa(x−1) of the adjacent band ABA (band BAa).

Moreover, the refresh processing method of example 1 can refresh the target band TBA (band BAb) in consideration of the count of write to the adjacent band ABA (band BAa). At this time, the counter 64, the nonvolatile memory 90, and the like are used.

The counter 64 can make the write count as k times each time the data is written to the adjacent band ABA (band BAa). For example, k=1. However, the value k may be less than 1 or greater than 1. The nonvolatile memory 90 functions as a recording unit and can store the cumulative total of the write count. Incidentally, the recording unit is not limited to the nonvolatile memory 90, but may be configured to store the cumulative total of the write count and may be a third memory (not shown).

When the determination unit 62 determines that the cumulative total of the count of write to the adjacent band ABA (band BAa) is less than a write count threshold, the determination unit 62 can determine that each of one or more recording sectors RSC of the track STRb0, which are aligned with one or more recording sectors RSC in the track STRa(x−1) in the radial direction d1, does not correspond to the quality-degraded recording sector DRSC. The determination unit 62 can determine that each of the plurality of recording sectors RSC(b, 0, 0) to RSC(b, 0, 4) of the track STRb0, which are aligned with the plurality of recording sectors RSC(a, x−1, 0) to RSC(a, x−1, 4) of the track STRa(x−1) in the radial direction d1, does not correspond to the quality-degraded recording sector DRSC.

An example of the above-mentioned write count threshold value is 200 (times). The write count threshold value can be changed variously.

In contrast, when the determination unit 62 determines that the cumulative total of the count of write to the adjacent band ABA (band BAa) is greater than or equal to the write count threshold value, the determination unit 62 can determine that each of one or more recording sectors RSC of the track STRb0, which are aligned with one or more recording sectors RSC of the tracks STRa(x−1) in the radial direction d1, corresponds to the quality-degraded recording sector DRSC. The determination unit 62 can determine that each of the plurality of recording sectors RSC(b, 0, 0) to RSC(b, 0, 4) of the track STRb0, which are aligned with the plurality of recording sectors RSC(a, x−1, 0) to RSC(a, x−1, 4) of the track STRa(x−1) in the radial direction d1, corresponds to the quality-degraded recording sector DRSC.

In this case, the refresh processing unit 63 can reset the cumulative total of the write count in the nonvolatile memory (recording unit) 90 when refreshing the plurality of target recording sectors TSC. The target band TBA (band BAb) can be thereby continuously refreshed.

Example 2 of Embodiment

Figure 11:
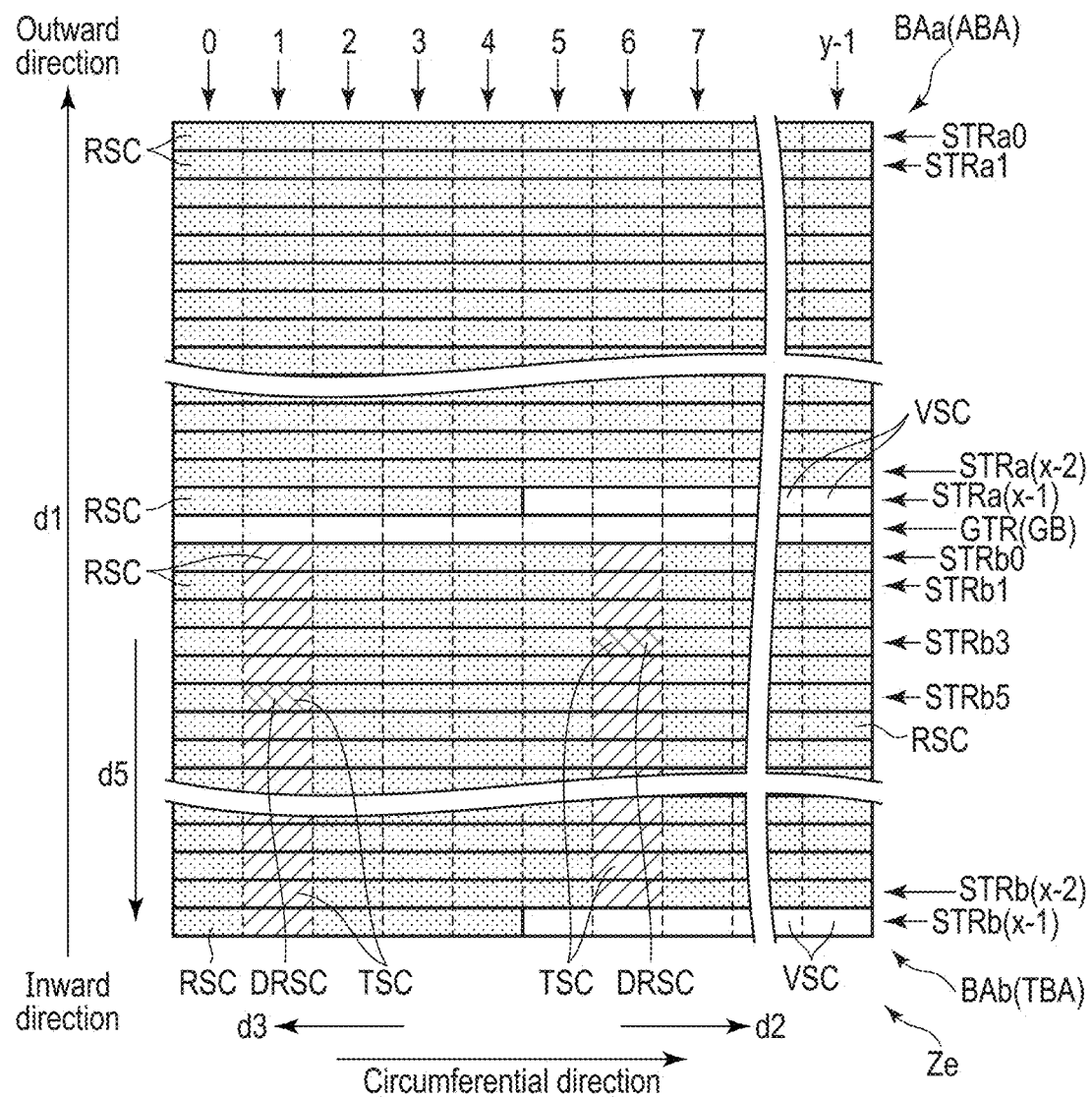
FIG. 11 is a schematic diagram showing two bands and one guard band shown in FIG. 7, illustrating a refresh processing method according to example 2 of the embodiment and a refresh processing method according to example 5 of the embodiment.

Next, the refresh processing method according to example 2 of the embodiment will be described. FIG. 11 is a schematic diagram showing the two bands BAa and BAb and one guard band GB shown in FIG. 7, illustrating the refresh processing method according to example 2.

In FIG. 11, each track STR has a rectangular shape for convenience of description but, in reality, each track STR is curved along the circumferential direction. In addition, a plurality of tracks STR are aligned in the overwrite direction d5 without overlapping but, in reality, the plurality of tracks STR are aligned in the overwrite direction d5 while overwrapping.

In the drawing, the recording sectors RSC are denoted by dot patterns. Unused sectors VSC are represented by a solid color. The quality-degraded recording sector DRSC, among the recording sectors RSC, is marked with a diagonal grating pattern instead of a dot pattern. A target recording sector TSC, among the recording sectors RSC, is marked with a diagonal line instead of a dot pattern. Incidentally, the quality-degraded recording sector DRSC is also the target recording sector TSC.

The refresh processing method according to comparative example 2 will be described before the refresh processing method according to example 2.

Figure 12:
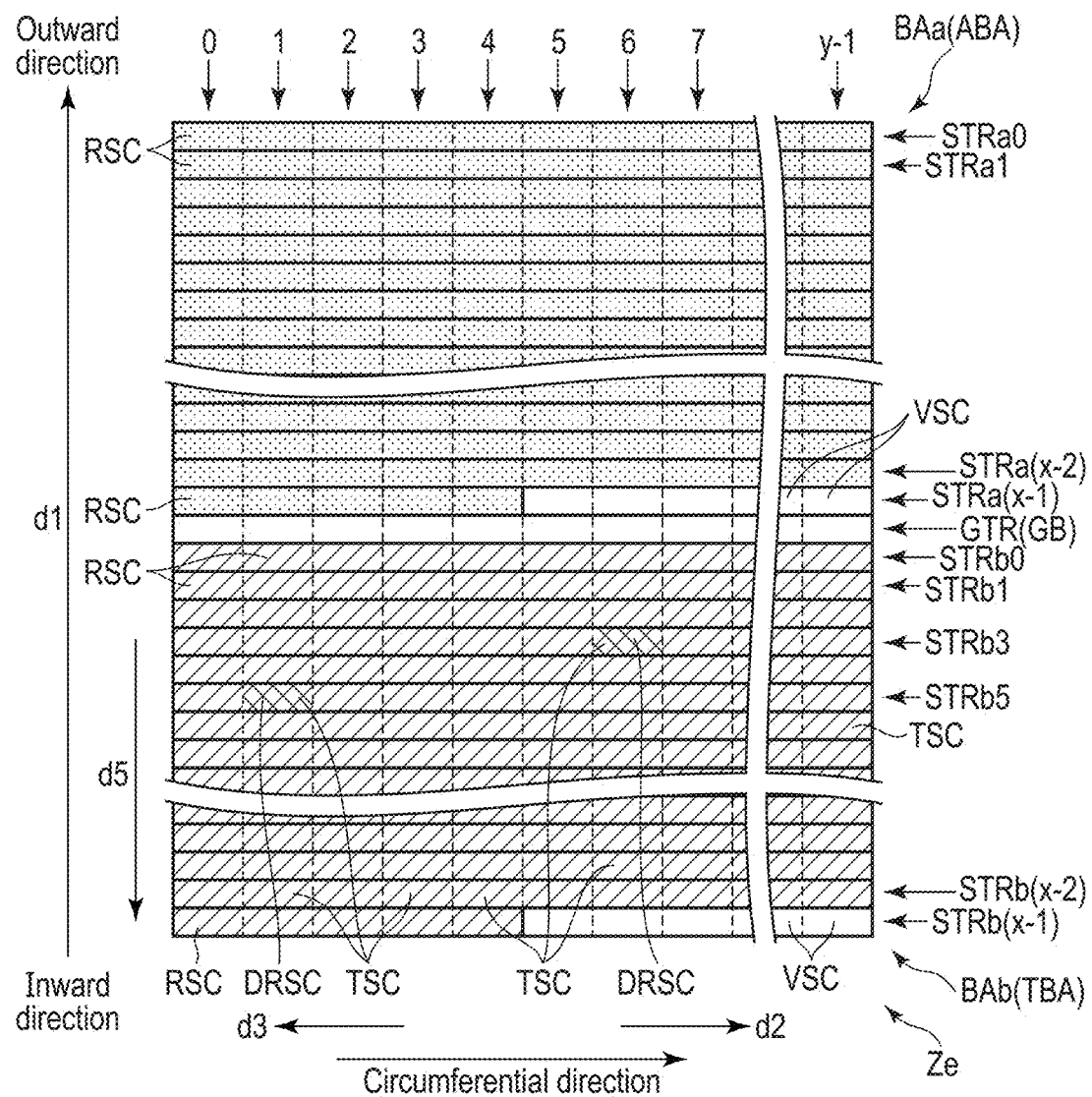
FIG. 12 is a schematic diagram showing two bands and one guard band shown in FIG. 7, illustrating a refresh processing method according to comparative example 2.

As shown in FIG. 12, the recording quality of the data in the band BAb is deteriorated when adversely affected by external disturbances at the time of writing the data to the disk DK, sudden deterioration of positioning of the write head WHD, change in the flying amount of the write head WHD due to Defect, and the like. In this example, each of recording sectors RSC(b, 5, 1) and RSC(b, 3, 6) of the band BAb is the quality-degraded recording sector DRSC.

For this reason, the band BAb needs to be subjected to the refresh processing. When the refresh processing is performed for the band BAb, all the recording sectors RSC of the band BAb become target recording sectors TSC, which are subject to refresh. The refresh processing unit 63 can read the target data of the plurality of target recording sectors TSC(all the recording sectors RSC), rewrite the target data to the plurality of target recording sectors TSC, and refresh the plurality of target recording sectors TSC.

In the example in FIG. 12, however, since the amount of data rewritten at the time of refresh of the band BAb cannot be reduced as described above, the write head WHD is worn severely.

Next, the refresh processing method according to example 2 will be described.

As shown in FIG. 11, when the refresh processing is performed for the band BAb, all the recording sectors RSC of the band BAb are not set as the target recording sectors TSC. The target recording sectors TSC of the band BAb are the plurality of recording sectors RSC aligned with a quality-degraded recording sector DRSC(b, 5, 1) and the plurality of recording sectors RSC aligned with a quality-degraded recording sector DRSC(b, 3, 6) in the overwrite direction d5.

In accordance with removing all the recording sectors RSC of numbers 0, 2 to 5, and 7 to y−1, among all the recording sectors RSC of the band Bab, from the target recording sectors TSC, the amount of data rewritten at the time of refresh of the band BAb can be reduced, and wear on the write head WHD can be suppressed.

Next, the refresh processing method according to the example 2 will be described in detail.

As shown in FIG. 1 and FIG. 11, in the target band TBA (band BAb), the plurality of target recording sectors TSC are the plurality of recording sectors RSC aligned in the overwrite direction d5. Each of the plurality of recording sectors RSC from recording sector RSC(b, 0, 1) to recording sector RSC(b, x−1, 1), which include a quality-degraded recording sector DRSC(b, 5, 1) and which are aligned in the overwrite direction d5, is the target recording sector TSC. In addition, each of the plurality of recording sectors RSC from recording sector RSC(b, 0, 6) to recording sector RSC(b, x−2, 6), which include a quality-degraded recording sector DRSC(b, 3, 6) and which are aligned in the overwrite direction d5, is also the target recording sector TSC. Only the plurality of recording sectors RSC that include the quality-degraded recording sector DRSC and that are aligned in the overwrite direction d5 can be refreshed. The amount of data rewritten at the time of refresh of the band BAb can be reduced, and the wear on the write head WHD can be suppressed.

Furthermore, the refresh processing method in example 2 can refresh the target band TBA (band BAb) during an idle period. At this time, the cache 81, the command execution unit 65, and the like are used.

The command execution unit 65 can execute write and read commands recorded in the cache 81. When the determination unit 62 determines an idle period in which no unexecuted commands exist in the cache 81, the refresh processing unit 63 can refresh a plurality of target recording sectors TSC during the idle period. As a result, the processing efficiency of the MPU 60 can be improved, and the usage efficiency of the head HD including the write head WHD can be improved.

Furthermore, the refresh processing method of the example 2 can refresh the target band TBA (band BAb) in consideration of the bit error rate (BER). In the example 2, the quality of data recorded in the recording sector RSC of the band BA is the bit error rate of the data.

The bit error rate of the data recorded in the quality-degraded recording sector DRSC, which is also the bit error rate of the data with quality lower than the reference level, is higher than the reference value. In contrast, the bit error rate of the data having quality higher than the reference level is lower than or equal to the reference value. The determination unit 62 can determine whether the quality-degraded recording sector DRSC in which the bit error rate of the recorded data is higher than the reference value is included in all the recording sectors RSC in which data is written, in each of the bands BA.

In the example 2, the determination unit 62 can detect that the bit error rate of the data in the recording sector RSC(b, 5, 1) is higher than the reference value and that the bit error rate of the data in the recording sector RSC(b, 3, 6) is higher than the reference value, and determine that each of the recording sectors RSC(b, 5, 1) and RSC(b, 3, 6) is the quality-degraded recording sector DRSC. Thus, it can be determined whether the recording sector corresponds to the quality-degraded recording sector DRSC, using the bit error rate of the data in the recording sector RSC as an index.

Example 3 of Embodiment

Figure 13:
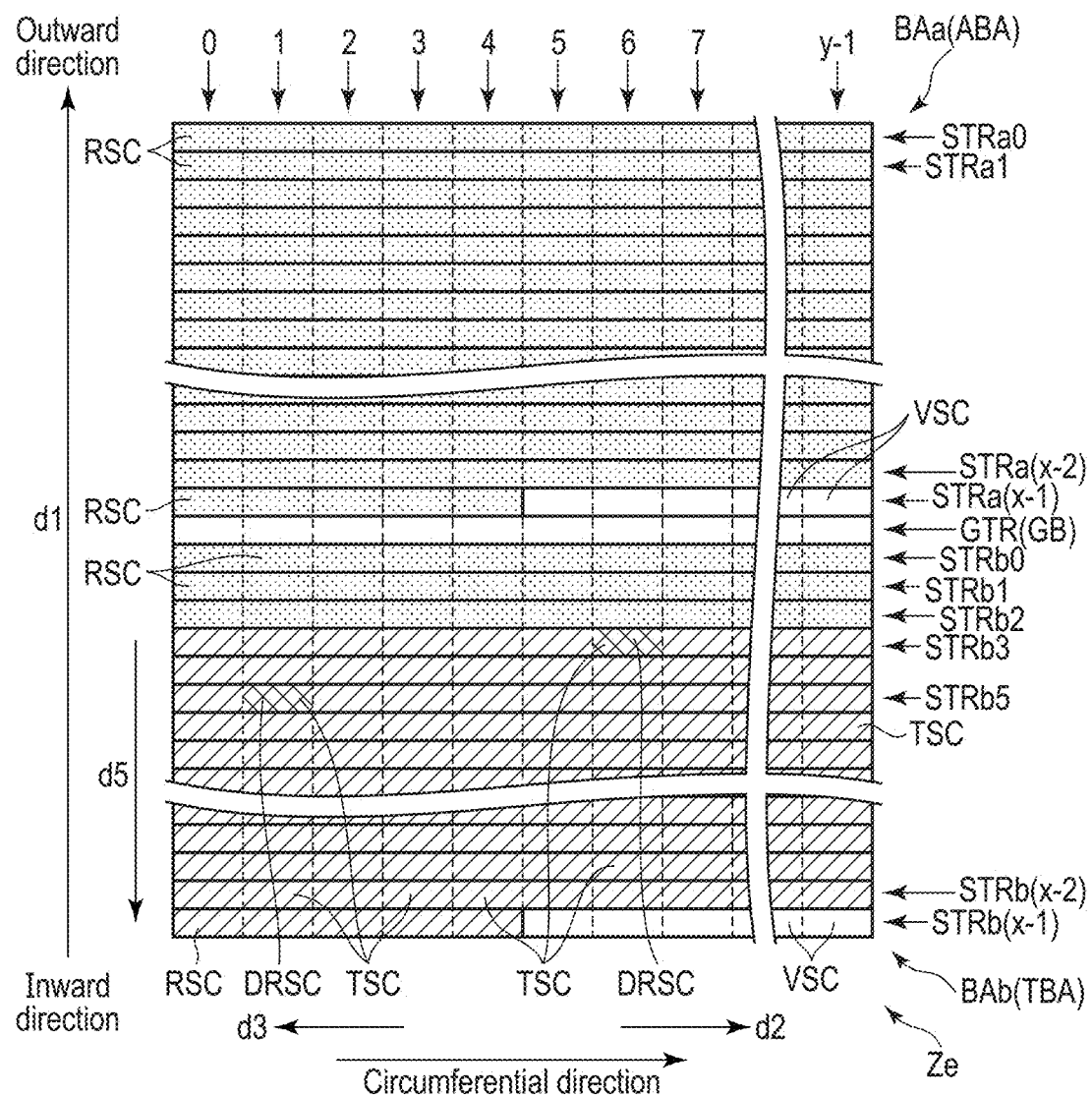
FIG. 13 is a schematic diagram showing two bands and one guard band shown in FIG. 7, illustrating a refresh processing method according to example 3 of the embodiment.

Next, the refresh processing method according to example 3 of the embodiment will be described. FIG. 13 is a schematic diagram showing the two bands BAa and BAb and one guard band GB shown in FIG. 7, illustrating the refresh processing method according to the example 3.

In FIG. 13, each track STR has a rectangular shape for convenience of description but, in reality, each track STR is curved along the circumferential direction. In addition, a plurality of tracks STR are aligned in the overwrite direction d5 without overlapping but, in reality, the plurality of tracks STR are aligned in the overwrite direction d5 while overwrapping.

In the drawing, the recording sectors RSC are denoted by dot patterns. Unused sectors VSC are represented by a solid color. The quality-degraded recording sector DRSC, among the recording sectors RSC, is marked with a diagonal grating pattern instead of a dot pattern. A target recording sector TSC, among the recording sectors RSC, is marked with a diagonal line instead of a dot pattern. Incidentally, the quality-degraded recording sector DRSC is also the target recording sector TSC.

As shown in FIG. 13, a track STRb3 which is a track different from the track STRb0 and which includes a quality-degraded recording sector DRSC(b, 3, 6), among the plurality of tracks STRb of the target band TBA (band BAb), functions as a fourth track. A track STRb5 is also a track different from the track STRb0, includes the quality-degraded recording sector DRSC(b, 5, 1), and functions as the fourth track. When a plurality of tracks STRb each including the quality-degraded recording sectors DRSC exist in the target band TBA (band BAb), the track STRb3, which is located at the most upper position in the overwrite direction d5, among the tracks STRb3 and STRb5, can be regarded as the fourth track, in example 3.

In the target band TBA (band BAb), the plurality of target recording sectors TSC are all the recording sectors RSC of the plurality of tracks STRb from the track STRb3 to the track STRb(x−1) in the overwrite direction d5. In the overwrite direction d5, the refresh processing is performed on the track STRb3 to which the quality-degraded recording sector DRSC(b, 3, 6) belongs and on the plurality of tracks STRb4 to STRb(x−1) that are located at the lower position from the track STRb3, in the band BAb.

In accordance with removing all the recording sectors RSC of the tracks STRb of numbers 0 to 2, among all the recording sectors RSC of the band BAb, from the target recording sectors TSC, the amount of data rewritten at the time of refresh of the band BAb can be reduced, and wear on the write head WHD can be suppressed.

In addition, data rewrite at the time of refresh of the band BAb can be started from the track STRb3. In accordance with making the rewrite of data to the tracks STRb0 to STRb2 unnecessary, the time required for the refresh processing can be shortened.

Example 4 of Embodiment

Figure 14:
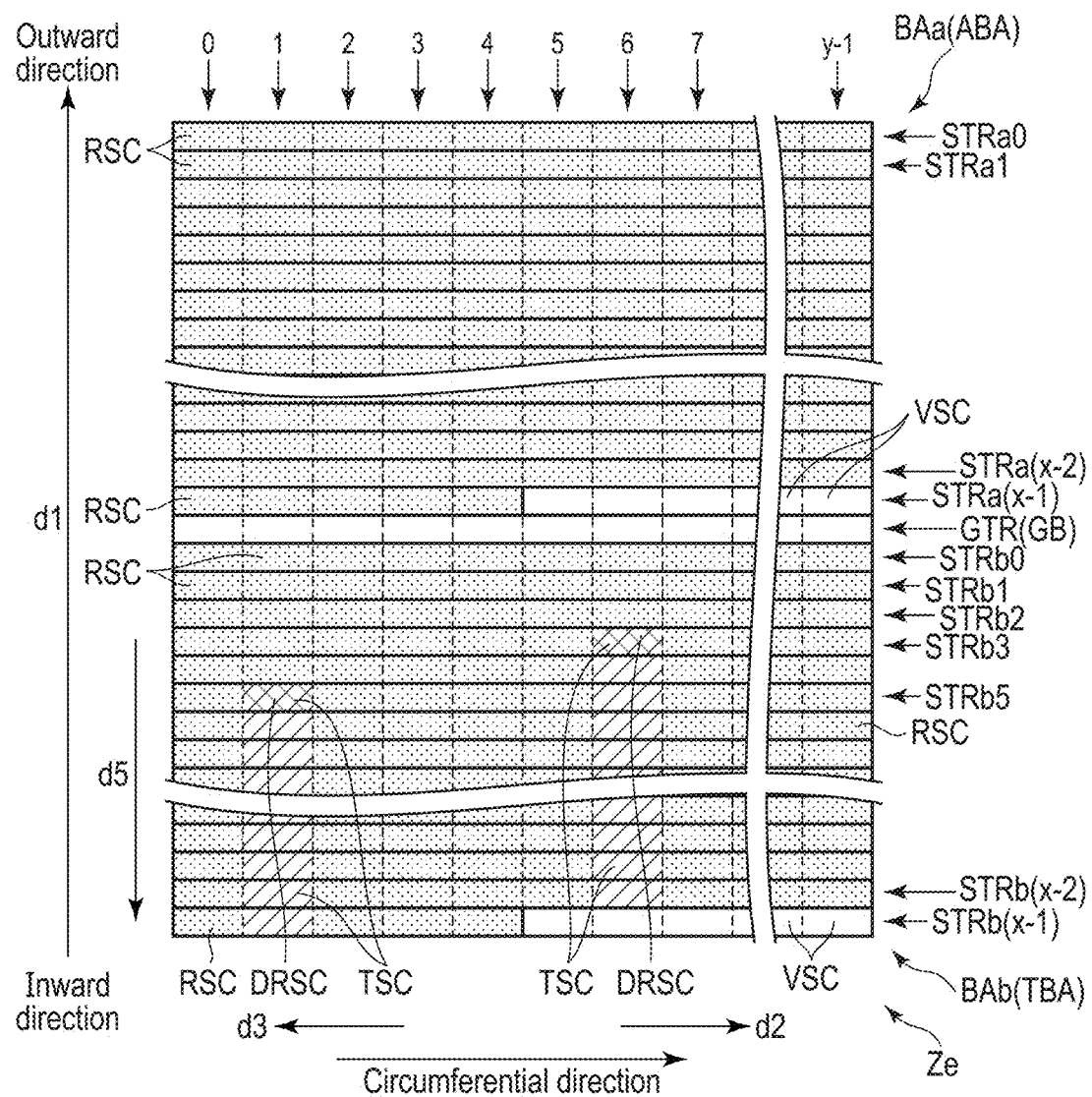
FIG. 14 is a schematic diagram showing two bands and one guard band shown in FIG. 7, illustrating a refresh processing method according to example 4 of the embodiment and a refresh processing method according to example 6 of the embodiment.

Next, the refresh processing method according to example 4 of the embodiment will be described. FIG. 14 is a schematic diagram showing the two bands BAa and BAb and one guard band GB shown in FIG. 7, illustrating the refresh processing method according to the example 4.

In FIG. 14, each track STR has a rectangular shape for convenience of description but, in reality, each track STR is curved along the circumferential direction. In addition, a plurality of tracks STR are aligned in the overwrite direction d5 without overlapping but, in reality, the plurality of tracks STR are aligned in the overwrite direction d5 while overwrapping.

In the drawing, the recording sectors RSC are denoted by dot patterns. Unused sectors VSC are represented by a solid color. The quality-degraded recording sector DRSC, among the recording sectors RSC, is marked with a diagonal grating pattern instead of a dot pattern. A target recording sector TSC, among the recording sectors RSC, is marked with a diagonal line instead of a dot pattern. Incidentally, the quality-degraded recording sector DRSC is also the target recording sector TSC.

As shown in FIG. 14, in the target band TBA (band BAb), a plurality of target recording sectors TSC are a plurality of recording sectors RSC aligned in the overwrite direction d5 from the quality-degraded recording sector DRSC(b, 5, 1) of the track STRb5 to the recording sector RSC(b, x−1, 1) of the track STRb(x−1). Furthermore, a plurality of target recording sectors TSC are a plurality of recording sectors RSC aligned in the overwrite direction d5 from the quality-degraded recording sector DRSC(b, 3, 6) of the track STRb3 to the recording sector RSC(b, x−2, 6) of the track STRb(x−2).

Since the data needs only to be rewritten to a plurality of target recording sectors TSC including the quality-degraded recording sector DRSC, in band BAb at the time of refresh, wear on the write head WHD can be suppressed.

In accordance with making the rewrite of data to the tracks STRb0 to STRb2 unnecessary at the time of refresh of the band BAb, the time required for the refresh processing can be shortened.

Furthermore, in the example 4, the target band TBA (band BAb) can be refreshed during the idle period similarly to the above-described example 2.

In addition, in example 4, the target band TBA (band BAb) can be refreshed in consideration of the bit error rate, similarly to the above-described example 2.

Example 5 of Embodiment

Next, the refresh processing method according to example 5 of the embodiment will be described. The refresh processing method is the same as the refresh processing method of the above-described second example except for the method described in the example 5.

As shown in FIG. 1 and FIG. 11, the target recording sector TSC can be limited (narrowed) from among all the recording sectors RSC in the target band TBA, in the example 5, too.

The refresh processing method of the example 5 can refresh the target band TBA (band BAb) in consideration of the read retry count instead of the bit error rate. The detection unit 66 can detect the count of reading the same data on the disk DK by the read processing unit 61b.

The count of reading the data recorded in the quality-degraded recording sector DRSC, which is also the count of reading the data having a quality lower than the reference level, is higher than the reference count. In contrast, the count of reading the data having quality higher than or equal to the reference level is less than or equal to the reference count. The determination unit 62 can determine whether or not the quality-degraded recording sector DRSC whose count of reading the recorded data is greater than the reference count exists in all the recording sectors RSC to which the data is written, in each band BA.

In the example 5, the determination unit 62 can detect that the count of reading the data in the recording sector RSC(b, 5, 1) is higher than the reference count and that the count of reading the data in the recording sector RSC(b, 3, 6) is higher than the reference count, and determine that each of the recording sectors RSC(b, 5, 1) and RSC(b, 3, 6) is the quality-degraded recording sector DRSC. Thus, it can be determined whether the recording sector corresponds to the quality-degraded recording sector DRSC, using the read retry count of the data in the recording sector RSC as an index.

The same advantages of the example 2 can be obtained from the example 5.

Example 6 of Embodiment

Next, the refresh processing method according to example 6 of the embodiment will be described. The refresh processing method is the same as the refresh processing method of the above-described fourth example except for the method described in the example 6.

As shown in FIG. 1 and FIG. 14, the target recording sector TSC can be limited (narrowed) from among all the recording sectors RSC in the target band TBA, in the example 6, too.

The refresh processing method of the example 6 can refresh the target band TBA (band BAb) in consideration of the read retry count instead of the bit error rate. Thus, it can be determined whether the recording sector corresponds to the quality-degraded recording sector DRSC, using the read retry count of the data in the recording sector RSC as an index.

The same advantages of the example 4 can be obtained from the example 6.

According to the magnetic disk device 1 and the refresh processing method according to the embodiment configured as described above, the magnetic disk device 1 comprises a disk DK, a write head WHD, a write processing unit 61a, a determination unit 62, and a refresh processing unit 63. The write processing unit 61a can select the shingled magnetic recording and cause the write head WHD to write the data to each of the bands BA. The determination unit 62 can determine whether the quality-degraded recording sector DRSC exists in all the recording sectors RSC in each of the bands BA. If the determination unit 62 determines that the target band TBA including the quality-degraded recording sector DRSC exists in the plurality of bands BA, the refresh processing unit 63 can read the target data of the plurality of target recording sectors TSC among all the recording sectors RSC in the target band TBA, rewrite the target data to the plurality of target recording sectors TSC, and refresh the plurality of target recording sectors TSC. The plurality of target recording sectors TSC include the quality-degraded recording sectors DRSC. In the target band TBA, the number of the target recording sectors TSC is less than the number of all the recording sectors RSC.

Since the amount of data rewritten at the time of refresh of the band BAb can be reduced, wear on the write head WHD can be suppressed. Based on the above, the magnetic disk device 1 capable of suppressing wear on the write head WHD can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above-described technology is not limited to hybrid recording type magnetic disk devices, but may be applied to shingled magnetic recording type magnetic disk devices.

What is claimed is:

1. A magnetic disk device comprising:
   a disk having a plurality of bands each including a plurality of tracks, each of the plurality of tracks including a plurality of sectors;
   a write head writing data to the disk;
   a write processing unit selecting shingled magnetic recording of overwriting data to the plurality of tracks in an overwrite direction parallel to a radial direction of the disk, and causing the write head to write data to each of the plurality of bands;
   a determination unit determining whether a quality-degraded recording sector in which quality of recorded data is lower than a reference level exists in all recording sectors to which data is written, in each of the plurality of bands; and
   a refresh processing unit, if it is determined that a target band including the quality-degraded recording sector exists in the plurality of bands, reading target data of a plurality of target recording sectors, which is a target of refresh, among all the recording sectors of the target band, rewriting target data to the plurality of target recording sectors, and refreshing the plurality of target recording sectors, wherein the plurality of target recording sectors include the quality-degraded recording sector, and the number of the plurality of target recording sectors is less than the number of all the recording sectors, in the target band.

2. The magnetic disk device of claim 1, wherein
the plurality of target recording sectors are a plurality of recording sectors aligned in the overwrite direction, in the target band.

3. The magnetic disk device of claim 1, wherein
the plurality of bands further include an adjacent band that is adjacent to the target band in the radial direction,
a first track on an end located most closely to the target band side, among the plurality of tracks of the adjacent band, includes one or more recording sectors and remaining unused sectors to which valid data is not written, and
the plurality of target recording sectors are a plurality of recording sectors aligned with the one or more recording sectors of the first track in the overwrite direction, in the target band.

4. The magnetic disk device of claim 3, further comprising:
a counter counting a write count as k every time writing data to the adjacent band; and
a recording unit storing a cumulative total of the write count,
wherein
when a track on an end located most closely to the adjacent band side, among the plurality of tracks of the target band, is referred to as a second track,
the determination unit
determines that each of one or more recording sectors aligned with the one or more recording sectors of the first track in the radial direction, in the second track, does not correspond to the quality-degraded recording sector when determining that the cumulative total of the write count is smaller than a write count threshold value, and
determines that each of one or more recording sectors aligned with the one or more recording sectors of the first track in the radial direction, in the second track, corresponds to the quality-degraded recording sector when determining that the cumulative total of the write count is greater than or equal to a write count threshold value, and
the refresh processing unit resets the cumulative total of the write count in the recording unit when refreshing the plurality of target recording sectors.

5. The magnetic disk device of claim 1, further comprising:
a cache storing a received write command and a received read command; and
a command execution unit executing the write command and the read command recorded in the cache,
wherein
when the determination unit determines an idle period in which no unexecuted commands exist in the cache, the refresh processing unit refreshes the plurality of target recording sectors during the idle period.

6. The magnetic disk device of claim 1, wherein
when a track to which data is first written in the shingled magnetic recording is referred to as a second track, a track to which data is last written is referred to as a third track, and a track different from the second track and including the quality-degraded recording sector is referred to as a fourth track, among the plurality of tracks of the target band, the plurality of target recording sectors are all recording sectors of a plurality of tracks from the fourth track to the third track, in the overwrite direction, in the target band.

7. The magnetic disk device of claim 1, wherein
when a track to which data is first written in the shingled magnetic recording is referred to as a second track, a track to which data is last written is referred to as a third track, and a track different from the second track and including the quality-degraded recording sector is referred to as a fourth track, among the plurality of tracks of the target band, the plurality of target recording sectors are a plurality of recording sectors aligned in the overwrite direction from the quality-degraded recording sector of the fourth track to the recording sector of the third track, in the target band.

8. The magnetic disk device of claim 1, wherein
quality of data recorded in the recording sector of the band is a bit error rate of the data,
a bit error rate of data recorded in the quality-degraded recording sector, which is also a bit error rate of data having quality lower than the reference level, is higher than a reference value,
a bit error rate of data having quality higher than or equal to the reference level is lower than or equal to the reference value, and
the determination unit determines whether the quality-degraded recording sector in which the bit error rate of the recorded data is higher than the reference value is included in all the recording sectors in which data is written, in each of the plurality of bands.

9. The magnetic disk device of claim 1, further comprising:
a read head reading data from the disk;
a read processing unit causing the read head to read data from the disk; and
a detection unit detecting a count of reading the same data of the disk by the read processing unit,
wherein
a count of reading the data recorded in the quality-degraded recording sector, which is also the count of reading the data having quality lower than the reference level, is higher than a reference count,
a count of reading the data having quality higher than or equal to the reference level is less than or equal to the reference count, and
the determination unit determines whether the quality-degraded recording sector in which the count of reading the recorded data is higher than the reference count is included in all the recording sectors in which data is written, in each of the plurality of bands.

10. The magnetic disk device of claim 1, wherein
the write head is a magnetic head for energy-assisted magnetic recording, which performs energy-assisted magnetic recording.

* * * * *